United States Patent
Yi et al.

(10) Patent No.: US 10,582,484 B2
(45) Date of Patent: *Mar. 3, 2020

(54) METHOD OF RECEIVING CONTROL INFORMATION FOR RECEIVING DISCOVERY REFERENCE SIGNAL AND APPARATUS THEREOF

(71) Applicant: LG Electronics Inc., Seoul (KR)

(72) Inventors: Yunjung Yi, Seoul (KR); Bonghoe Kim, Seoul (KR); Kijun Kim, Seoul (KR); Joonkui Ahn, Seoul (KR); Jonghyun Park, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,957

(22) Filed: Aug. 10, 2018

(65) Prior Publication Data

US 2019/0007933 A1 Jan. 3, 2019

Related U.S. Application Data

(63) Continuation of application No. 15/123,460, filed as application No. PCT/KR2015/002102 on Mar. 4, 2015, now Pat. No. 10,080,218.

(Continued)

(51) Int. Cl.
*H04W 72/04* (2009.01)
*H04L 5/00* (2006.01)
(Continued)

(52) U.S. Cl.
CPC ....... *H04W 72/042* (2013.01); *H04J 11/0069* (2013.01); *H04L 5/001* (2013.01);
(Continued)

(58) Field of Classification Search
CPC ............... H04J 11/0036; H04J 11/0069; H04J 2211/005; H04B 7/0456; H04L 5/0048;
(Continued)

(56) References Cited

U.S. PATENT DOCUMENTS 9,749,075 B2 * 8/2017 Liao ................. H04J 11/005
2013/0273878 A1 * 10/2013 Heo ..................... H04W 28/02
455/405

(Continued)

FOREIGN PATENT DOCUMENTS

CN 103108405 A 5/2013
CN 103392299 A 11/2013
(Continued)

OTHER PUBLICATIONS

Hisilicon Huawei, "Enhancements of RRM Measurement for Small Cell On/Off", R1-140038, 3GPP TSG RAN WG1 Meeting #76, Feb. 10-14, 2014.

(Continued)

Primary Examiner — Robert J Lopata
(74) Attorney, Agent, or Firm — Dentons US LLP

(57) ABSTRACT

The present specification provides a method and UE for receiving configuration usable for a discovery, which can be used in a small cell scenario. In detail, the UE is configured for receiving measurement configuration for a discovery signal, wherein the discovery signal includes CRS, PSS, and SSS. The discovery may further include a channel status information-reference signal (CSI-RS) depending on a configuration of the CSI-RS. The measurement configuration may include at least one set of configuration elements. The UE performs a measurement on the discovery signal based on the received configuration. Further, the UE receives channel status information-reference signal (CSI-RS) configuration including at least one set of CSI-RS configuration (Continued)

elements used for a zero power CSI-RS, wherein the CSI-RS configuration includes at least one set of CSI-RS configuration elements, each set of CSI-RS configuration elements includes CSI-RS interval information and CSI-RS offset information.

18 Claims, 19 Drawing Sheets

Related U.S. Application Data

(60) Provisional application No. 62/037,127, filed on Aug. 14, 2014, provisional application No. 62/004,205, filed on May 29, 2014, provisional application No. 61/990,657, filed on May 8, 2014, provisional application No. 61/974,990, filed on Apr. 3, 2014, provisional application No. 61/972,386, filed on Mar. 30, 2014, provisional application No. 61/953,947, filed on Mar. 17, 2014, provisional application No. 61/947,444, filed on Mar. 4, 2014.

(51) Int. Cl.
| | | |
|---|---|---|
| *H04J 11/00* | (2006.01) | |
| *H04W 72/08* | (2009.01) | |
| *H04L 5/14* | (2006.01) | |
| *H04W 4/06* | (2009.01) | |
| *H04W 88/02* | (2009.01) | |
| *H04W 88/08* | (2009.01) | |

(52) U.S. Cl.
CPC .............. *H04L 5/0048* (2013.01); *H04L 5/14* (2013.01); *H04W 4/06* (2013.01); *H04W 72/0406* (2013.01); *H04W 72/08* (2013.01); *H04W 72/082* (2013.01); *H04W 88/02* (2013.01); *H04W 88/08* (2013.01)

(58) Field of Classification Search
CPC .......... H04L 5/14; H04W 4/06; H04W 72/04; H04W 72/0406; H04W 72/042; H04W 72/08; H04W 72/082; H04W 84/12; H04W 88/02; H04W 88/08
USPC ......................................................... 370/280
See application file for complete search history.

(56) References Cited

U.S. PATENT DOCUMENTS

| | | | | |
|---|---|---|---|---|
| 2014/0038598 | A1* | 2/2014 | Ren | H04W 48/16 |
| | | | | 455/434 |
| 2015/0092768 | A1* | 4/2015 | Ng | H04W 48/16 |
| | | | | 370/350 |
| 2015/0189574 | A1* | 7/2015 | Ng | H04W 24/08 |
| | | | | 370/252 |
| 2015/0215761 | A1* | 7/2015 | Chen | H04W 56/0015 |
| | | | | 370/255 |
| 2015/0223149 | A1* | 8/2015 | Liu | H04W 48/12 |
| | | | | 370/252 |
| 2015/0223245 | A1* | 8/2015 | Cheng | H04W 48/16 |
| | | | | 370/329 |
| 2016/0007406 | A1* | 1/2016 | Yi | H04W 52/0206 |
| | | | | 370/252 |
| 2016/0013984 | A1* | 1/2016 | Sun | H04W 24/08 |
| | | | | 370/252 |
| 2016/0227602 | A1* | 8/2016 | Yi | H04W 48/16 |
| 2017/0048041 | A1* | 2/2017 | Yi | H04L 5/0048 |
| 2017/0070312 | A1* | 3/2017 | Yi | H04J 11/0069 |
| 2017/0078062 | A1* | 3/2017 | Park | H04B 7/26 |
| 2017/0078953 | A1* | 3/2017 | You | H04L 5/0048 |
| 2017/0230852 | A1* | 8/2017 | You | H04L 1/0693 |
| 2017/0245205 | A1* | 8/2017 | You | H04L 1/0693 |

FOREIGN PATENT DOCUMENTS

| | | |
|---|---|---|
| EP | 3151622 A1 | 5/2015 |
| JP | 2015065607 A | 4/2015 |
| RU | 2462815 C2 | 9/2012 |
| WO | 12057571 A2 | 5/2012 |
| WO | 2014-008665 A1 | 1/2014 |
| WO | 2014020997 | 2/2014 |

OTHER PUBLICATIONS

Fujitsu, "Discussion on Discovery and Measurement for Small Cell On/Off", R1-140191, 3GPP TSG RAN WF1 Meeting #76, Feb. 10-14, 2014.
LG Electronics, "Other Design Aspects for TDD eIMTA", R1-140300, 3GPP TSG RAN WG1 Meeting #76, Feb. 10-14, 2014.
Broadcom Corporation, "Small Cell Discovery and Measurements", R1-140610, 3GPP TSG RAN WG1 Meeting #76, Feb. 10-14, 2014.
NEC, "Small cell discovery signal design", 3GPP TSG RAN WG1 Meeting #76, Feb. 10-14, 2014, R1-140487.

* cited by examiner

Antenna 0

METHOD OF RECEIVING CONTROL INFORMATION FOR RECEIVING DISCOVERY REFERENCE SIGNAL AND APPARATUS THEREOF

This application is a Continuation of U.S. application Ser. No. 15/123,460 filed Sep. 2, 2016, which is a National Stage under 35 U.S.C. 371 of International Application No. PCT/KR2015/002102 filed Mar. 4, 2015, which claims the benefit of U.S. Provisional Application Nos. 62/037,127 filed Aug. 14, 2014; 62/004,205 filed May 29, 2014; 61/990,657 filed May 8, 2014; 61/974,990 filed Apr. 3, 2014; 61/972,386 filed Mar. 30, 2014; 61/953,947 filed Mar. 17, 2014 and 61/947,444 filed Mar. 4, 2014, all of which are hereby incorporated by reference in their entirety.

TECHNICAL FIELD

This specification relates to a method of receiving control information used for a discovery reference signal, more specifically to a method of receiving configuration information used for measuring a discovery reference signal in a user equipment (UE).

BACKGROUND ART

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established where one CG can have multiple CCs. Each CC is defined by a single bandwidth and a center frequency.

Recently, a wireless access network configuration has been changed such that various types of small cells having small sizes, such as a pico cell, a femto cell, etc., interact with a macro cell having a relatively large size. The wireless access network configuration aims to provide a high data rate to final UEs and thus increase Quality of Experience (QoE) for the final UEs in a situation where multi-layer cells coexist in a hierarchical structure basically involving a macro cell.

According to one of the current 3rd Generation Partnership Project (3GPP) standardization categories, Small Cell Enhancements for E-UTRA and E-UTRAN SI; e.g., RP-122033, enhancement of indoor/outdoor scenarios using low-power nodes is discussed under the title of small cell enhancement. In addition, scenarios and requirements for the small cell enhancement are described in 3GPP TR 36.932.

Meanwhile, the usage of small cell is getting grown in many fields nowadays, such as pico cells, small cells under dual connectivity, etc. To properly perform communication between the small cells and UEs, improvements related to conventional control signals, such as reference signals and synchronous signals, have been discussed

DISCLOSURE

Technical Problem

Recently, a number of issues regarding a discovery reference signal (DRS) have been discussed. An object of the present specification is to provide a method and apparatus for providing an advanced scheme to support the DRS in a wireless communication. In detail, the present specification proposes detailed embodiments related to candidates which can be used as DRS. Further, the present specification proposes a clarification and/or embodiment with respect to alignment between a measurement gap and the DRS. Further, the present specification proposes an embodiment of configurations related to measurement timing of the DRS. In such embodiment, detailed configuration elements are defined per each frequency, which is corresponding to a cell. The present specification proposes a clarification and/or embodiment with respect to misalignment with respect to a number of cells. The present specification also proposes a clarification and/or embodiment with respect to enhanced Interference Mitigation & Traffic Adaptation (eIMTA), which dynamically changes Time Division Duplex (TDD) configuration in the context of DRS operations.

With respect to the above-mentioned objects of the present specification, it should be noted that the present specification now proposes a number of additional features and the above-mentioned objects are introduced for exemplary purposes, and thus the objects of the present specification are not limited to the foregoing objects.

Technical Solution

An embodiment of the present specification is to provide a method of receiving control information for receiving a signal in a wireless communication system, the method performed by a user equipment (UE). Further, the present specification also proposes a wireless device, e.g., UE, to perform the proposed method.

Preferably, the UE is configured for receiving measurement configuration for a discovery signal, wherein the discovery signal includes a cell-specific reference signal (CRS), a primary synchronization signal (PSS), and a secondary synchronization signal (SSS).

In addition, the discovery signal may further include a channel status information-reference signal (CSI-RS) depending on a configuration of the CSI-RS.

The measurement configuration may include at least one set of configuration elements, each set of the configuration elements being defined per a frequency of a corresponding cell. In detail, the each set of the configuration elements indicates a measurement period of the discovery signal, an offset of the measurement period, and a measurement duration during which the UE measures the discovery signal in one period of the measurement period.

Preferably, the measurement configuration for a discovery signal is received via a radio resource control (RRC) message. Moreover, the RRC message is received at the UE being in an RRC connected mode. The measurement on the discovery signal starts on a first subframe carrying the SSS in one period of the measurement period. Further, a set of the configuration elements defined for one frequency contains a single measurement period, a single offset, and a single measurement duration. The each set of the configuration elements is applied to a plurality of cells having a same frequency.

The UE is configured for performing a measurement on the discovery signal based on the measurement period of the discovery signal, the offset of the measurement period, and the measurement duration.

Additionally, the UE may further comprising: receiving measurement gap configuration indicating a length and a repetition period of a measurement gap, wherein the measurement period of the discovery signal is set to be a multiple of the repetition period of a measurement gap.

Additionally, the UE's measurement on the discovery signal is only performed on a TDD downlink subframe allocated by SIB when an enhanced Interference Mitigation & Traffic Adaptation (eIMTA) is used for the UE.

Additionally, the UE may further comprising receiving channel status information-reference signal (CSI-RS) configuration including at least one set of CSI-RS configuration elements used for a zero power CSI RS. The CSI-RS configuration includes a plurality set of CSI-RS configuration elements, each set of CSI-RS configuration elements includes CSI-RS interval information and CSI-RS offset information, and each set of CSI-RS configuration elements is separately configured.

Additionally, the UE expecting to receive MBMS subframe(s) and/or MBMS service may not expect to receive discovery signal in a corresponding subframe.

When performing the above embodiments, a system frame number (SFN) of a macro cell of the UE is used as a reference for a duration where the UE performs the measurement on the discovery signal.

Advantageous Effects

According to the present specification, an advanced example clarifying candidates which can be used as DRS is proposed. Further, an advanced example clarifying alignment between a measurement gap and the DRS is proposed in the present specification. Further, an advanced example related configuration related to measurement timing of the DRS is proposed. Further, an advanced example related to configuration related to measurement timing of the DRS is proposed. Further, an advanced example with respect to misalignment with respect to a number of cells is proposed. Also, an advanced example related to the eIMTA is proposed in the present specification.

MODE FOR INVENTION

Figure 1:
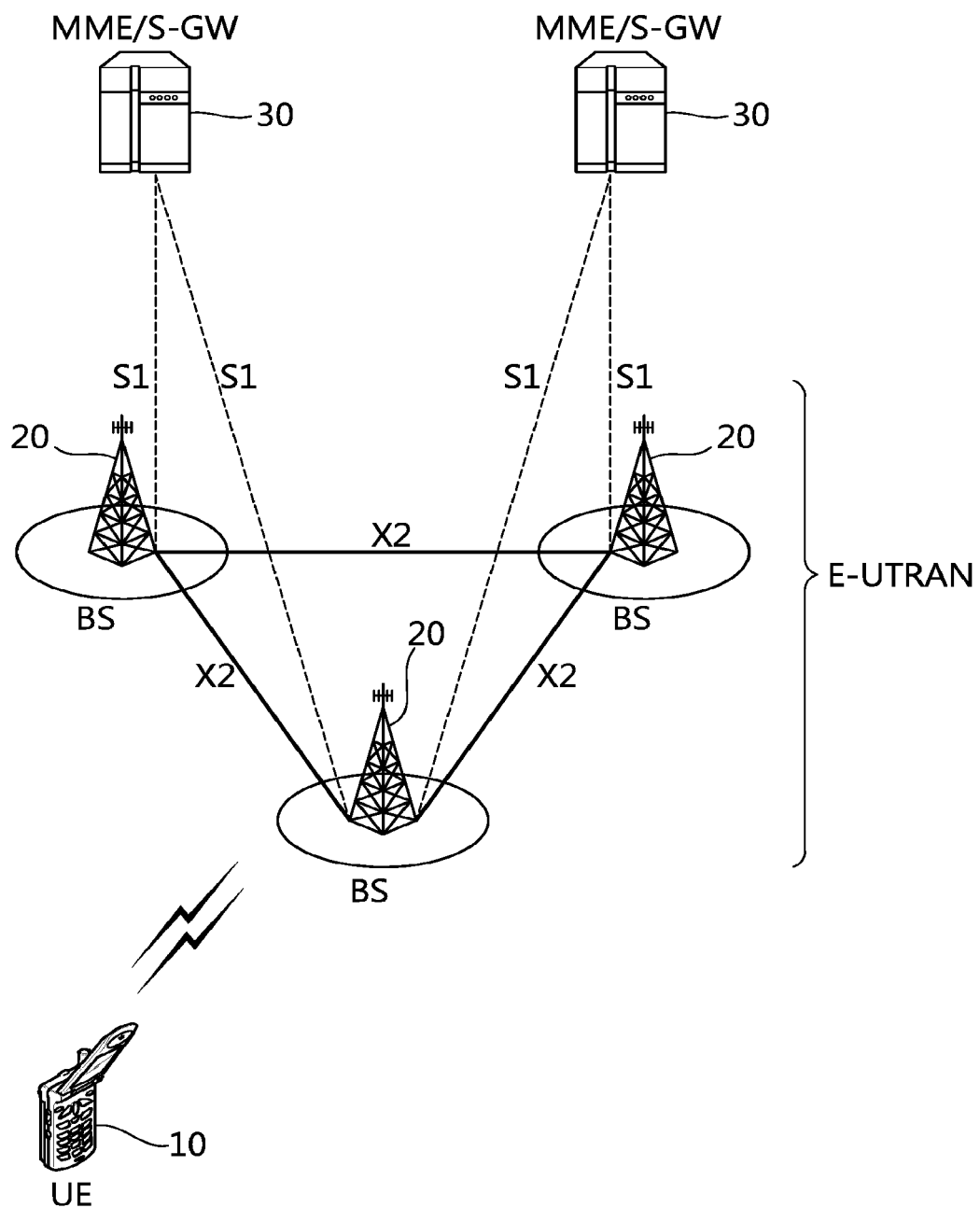
FIG. 1 shows a wireless communication system to which the present specification is applied.

FIG. 1 shows a wireless communication system to which the present specification is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex)

scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
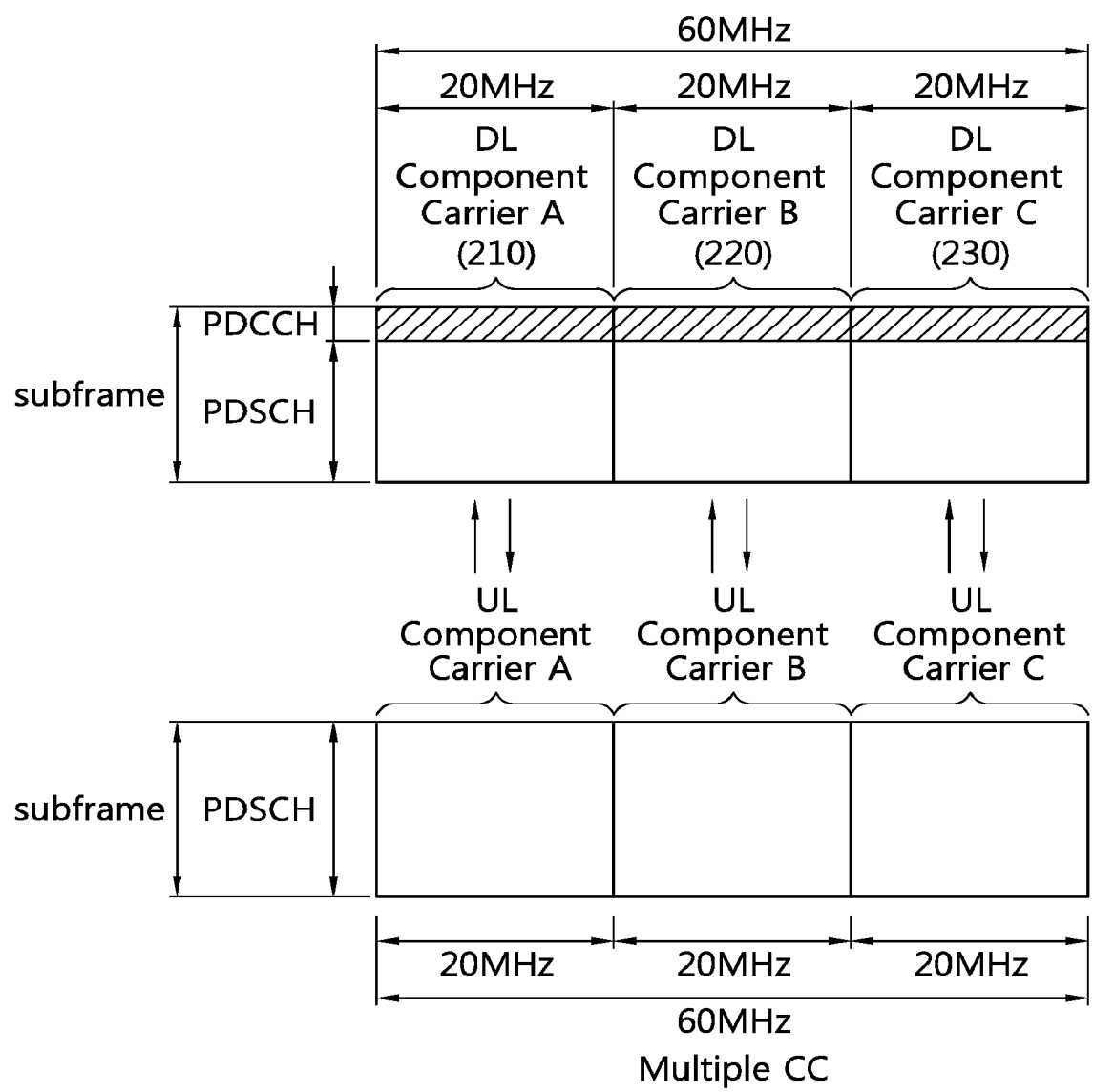
FIG. 2 shows an exemplary concept for a carrier aggregation (CA) technology according to an exemplary embodiment of the present specification.

FIG. 2 shows an exemplary concept for a carrier aggregation (CA) technology according to an exemplary embodiment of the present specification.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report channel-quality indicator (CQI)/precoding matrix indicator (PMI)/rank indicator (RD/procedure transaction identifier (PTI) for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
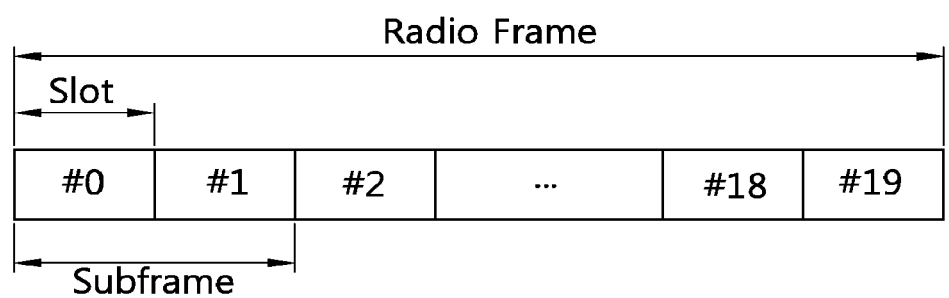
FIG. 3 shows a structure of a radio frame to which the present specification is applied.

FIG. 3 shows a structure of a radio frame to which the present specification is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This specification has no limitation to adapt to other system by varying the specific feature and the embodiment of the specification can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number NDL of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present specification uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (TX) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

Hereinafter, technical features related to synchronization signals used in wireless communication system to which the present specification is applied.

Figure 4:
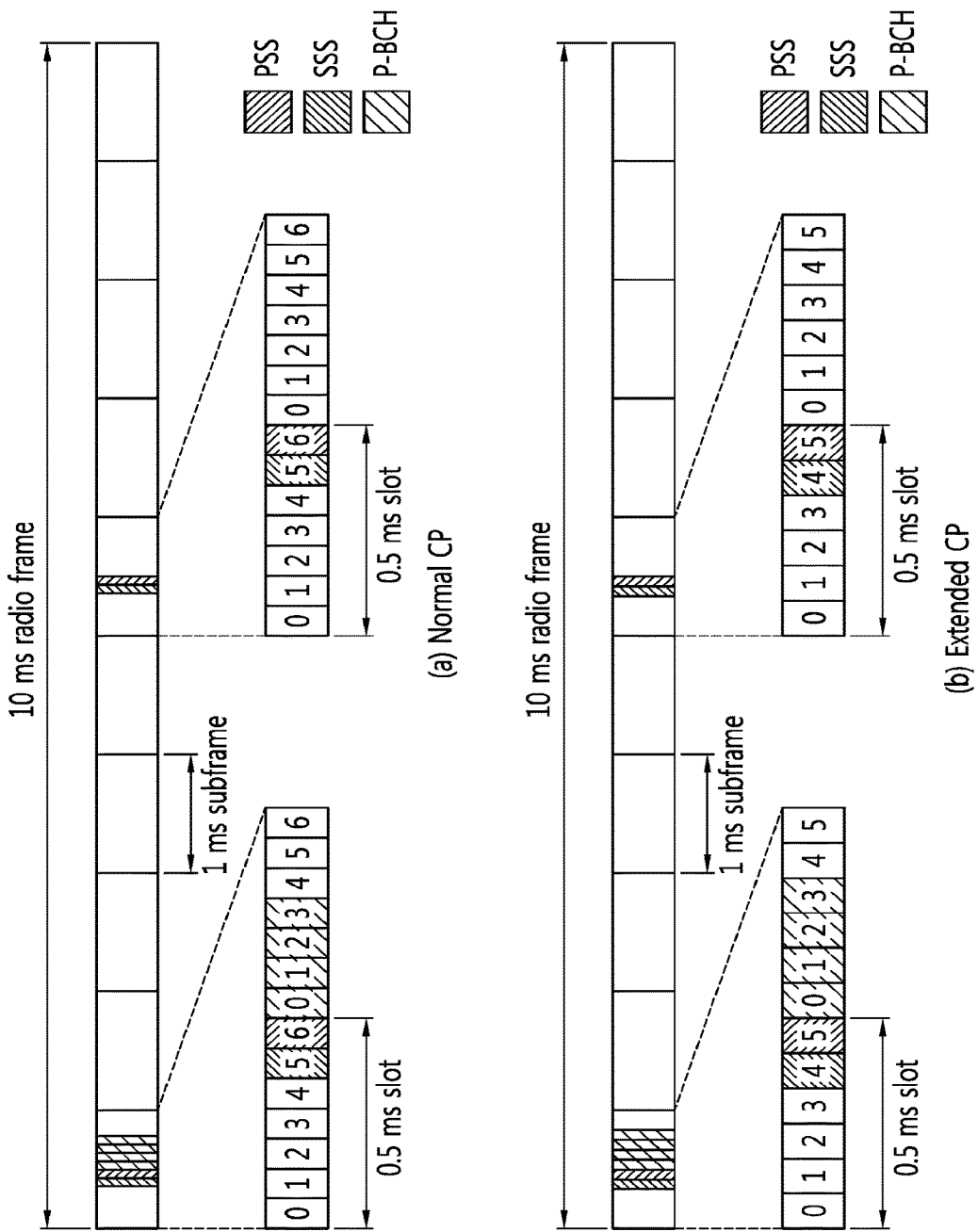
FIG. 4 shows an example of a synchronization signal which is used in a basic CP and an extended CP.

FIG. 4 shows an example of a synchronization signal which is used in a basic CP and an extended CP.

The synchronization signal may be divided into a primary SS (PSS) and a secondary SS (SSS) depending on the role and structure thereof. As illustrated in FIG. 4, when the basic CP and the extended CP are used, PSS/SSS is included in the preset subframe. Specifically, the synchronization signals (SS) are respectively transmitted from the second slots of subframe 0 and subframe 5 in consideration of the GSM frame length 4.6 ms, and the boundary for the radio frame may be detected through the SSS. The PSS is transmitted in the last OFDM symbol of the slot, and the SSS is transmitted in the OFDM symbol right before the PSS. The SS may transmit a total of 504 physical cell IDs through the combination of 3 PSSs and 168 SSSs. Further, the SS and the PBCH are transmitted within central 6 RBs within the system bandwidth so that the UE may be detected or decoded regardless of the transmission bandwidth.

The detailed operation related with the PSS will be described below.

Zadoff-Chu (ZC) sequence of length 63 is defined in the frequency domain and is used as the sequence of the PSS. The ZC sequence is defined by formula 1 below, and the sequence element corresponding to the DC subcarrier, n=31, is punctured. In the formula 1 below, Nzc=63.

$$d\_u(n)=e^{\wedge}(-j\pi un(n+1)/N\_ZC)$$ [Math Figure 1]

9 remaining subcarriers among central 6 RBs (=72 subcarriers) are always transmitted with the value 0 and make the filter design for synchronization easy. In order to define a total of 3 PSSs, in formula 1, u=25, 29, and 34 are used.

At this time, 29 and 34 have the conjugate symmetry relation and thus two correlations may be simultaneously performed. Here, the conjugate symmetry refers to the relation of formula 2 (the first formula is when Nzc is an even number, and the second formula is when Nzc is an odd number), and the one shot correlator for u=29 and 34 may be implemented by using this characteristic, and the overall amount of operations may be reduced by about 33.3%.

$$d_u(n)=(-1)^n(d_{N_{zc}-u}(n))^*$$

$$d_u(n)=(d_{N_{zc}-u}(n))^*$$ [Math Figure 2]

The detailed operation related with SSS will be described below.

Figure 5:
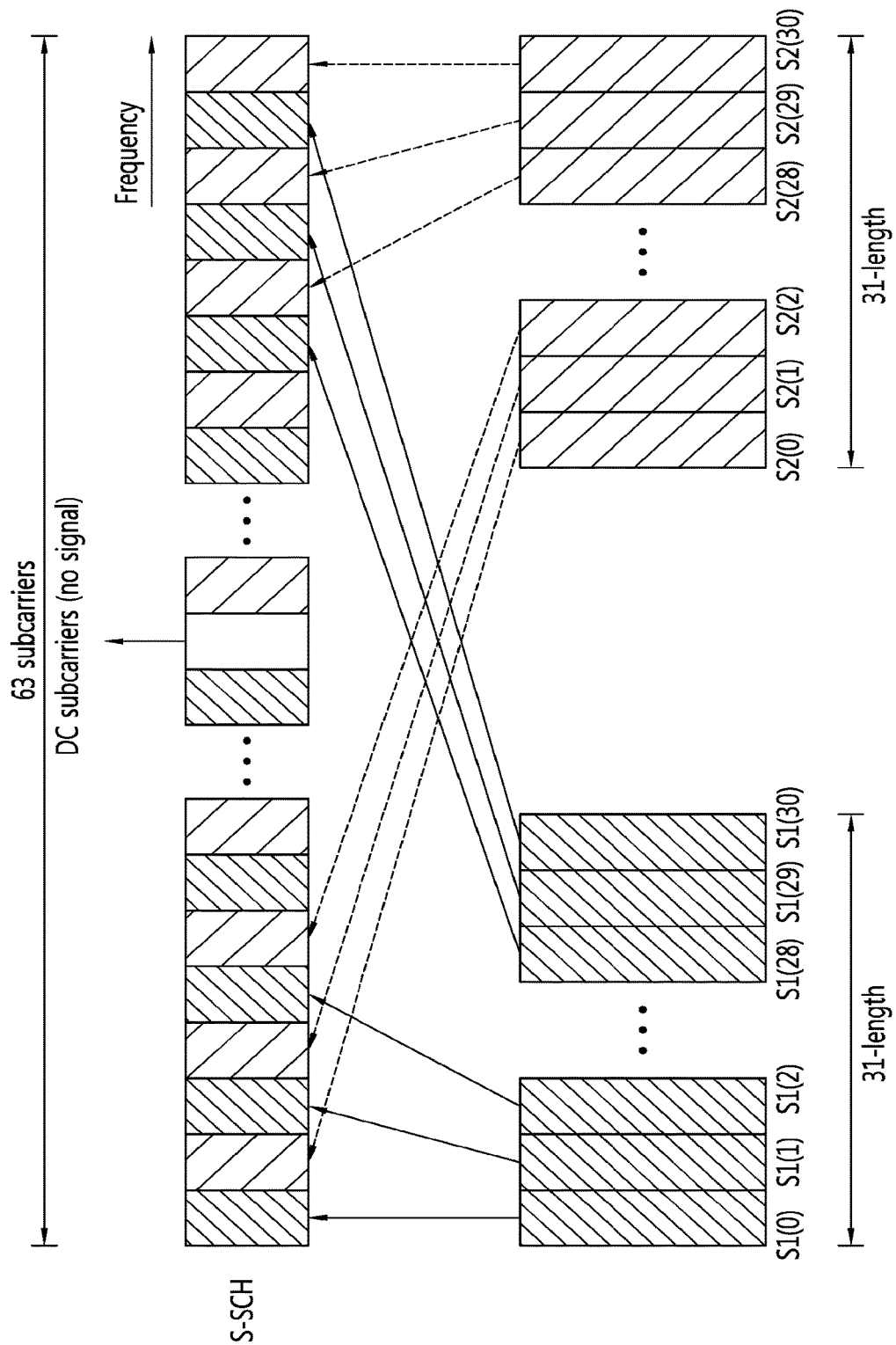
FIG. 5 shows a scheme of generating a code related to a sub-synchronous signal (SSS).

FIG. 5 shows a scheme of generating a code related to a sub-synchronous signal (SSS).

The sequence, which is used for SSS, performs interleaved joining of two m-sequences of length 31 and combines the two sequences so as to transmit 168 cell group ids. The m-sequence as the sequence of the SSS is strong in the frequency selective environment, and the amount of operations may be reduced by a high speed m-sequence conversion which uses the fast Hadamard transformation. Furthermore, configuring SSS with two short codes has been suggested to reduce the amount of operations of the UE.

FIG. 5 shows that two sequences in the logical region are interleaved in the physical region so as to be mapped. When two m-sequences, which are used for generation of SSS code, are defined as S1 and S2, if the SSS of subframe 0 transmits the cell group ID with (S1, S2) combination, SSS of subframe 5 swapped with (S2, S2) so as to be transmitted, and thus 10 ms frame boundary may be distinguished. At this time, the used SSS code uses a polynomial of $x^5+x^2+1$, and may generate a total of 31 codes through different circular shifts.

In order to enhance the receiving performance, the PSS-based two different sequences are defined so as to be scrambled to the SSS and are scrambled to different sequences to S1 and S2. Thereafter, S1-based scrambling code is defined, and scrambling is performed in S2. At this time, the code of the SSS is exchanged in 5 ms units, but the PSS-based scrambling code is not exchanged. The PSS-based scrambling code is defined as 6 circular shifts version according to the PSS index in the m-sequence which is generated from the polynomial of $x^5+x^3+1$, and S1-based scrambling code is defined as 8 circular shifts version according to the index of S1 in the m-sequence which is generated from the polynomial of $x^5+x^4+x^2+x^1+1$.

Hereinafter, the concept of multi-node system, which is associated with coordinated multi-point (CoMP) transmission scheme, is explained in detail.

To improve a performance of the wireless communication system, a technique is evolved in a direction of increasing density of nodes capable of accessing to an area around a user. A wireless communication system having nodes with higher density can provide a higher performance through cooperation between the nodes.

Figure 6:
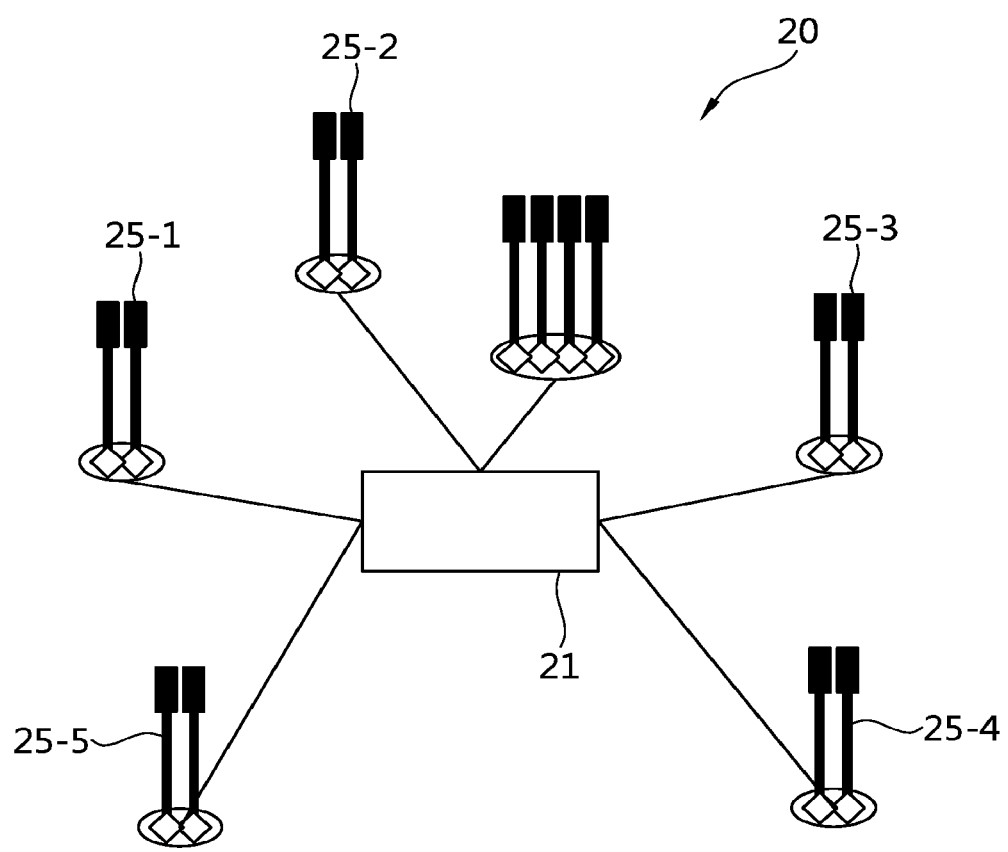
FIG. 6 shows an example of a multi-node system.

FIG. 6 shows an example of a multi-node system.

Referring to FIG. 6, a multi-node system 20 may consist of one BS 21 and a plurality of nodes 25-1, 25-2, 25-3, 25-4, and 25-5. The plurality of nodes 25-1, 25-2, 25-3, 25-4, and 25-5 may be managed by one BS 21. That is, the plurality of nodes 25-1, 25-2, 25-3, 25-4, and 25-5 operate as if they are a part of one cell. In this case, each of the nodes 25-1, 25-2, 25-3, 25-4, and 25-5 may be allocated a separate node identifier (ID), or may operate as if it is a part of an antenna group without an additional node ID. In this case, the multi-node system 20 of FIG. 6 may be regarded as a distributed multi node system (DMNS) which constitutes one cell.

Alternatively, the plurality of nodes 25-1, 25-2, 25-3, 25-4, and 25-5 may have separate cell IDs and perform a handover (HO) and scheduling of the UE. In this case, the multi-node system 20 of FIG. 6 may be regarded as a multi-cell system. The BS 21 may be a macro cell. Each node may be a femto cell or pico cell having cell coverage smaller than cell coverage of a macro cell. As such, if a plurality of cells is configured in an overlaid manner according to coverage, it may be called a multi-tier network.

In FIG. 6, each of the nodes 25-1, 25-2, 25-3, 25-4, and 25-5 may be any one of a BS, a Node-B, an eNode-B, a pico cell eNB (PeNB), a home eNB (HeNB), a remote radio head (RRH), a relay station (RS) or repeater, and a distributed antenna. At least one antenna may be installed in one node. In addition, the node may be called a point. In the following descriptions, a node implies an antenna group separated by more than a specific interval in a DMNS. That is, it is assumed in the following descriptions that each node implies an RRH in a physical manner. However, the present specification is not limited thereto, and the node may be defined as any antenna group irrespective of a physical interval. For example, the present specification may be applied by considering that a node consisting of horizontal polarized antennas and a node consisting of vertical polarized antennas constitute a BS consisting of a plurality of cross polarized antennas. In addition, the present specification may be applied to a case where each node is a pico cell or femto cell having smaller cell coverage than a macro cell, that is, to a multi-cell system. In the following descriptions, an antenna may be replaced with an antenna port, virtual antenna, antenna group, as well as a physical antenna.

A coordinated multi-point (CoMP) transmission means a cooperative communication scheme between nodes. In a multi-cell distributed multi-node system, inter-cell interference may be reduced by applying the CoMP transmission. In a single cell distributed multi-node system, intra-cell inter-point interference may be reduced by applying the CoMP transmission. A UE may receive data from a plurality of nodes in common by performing the CoMP transmission. Further, each node may simultaneously support at least one UE by using the same radio frequency resource in order to improve a performance of a system. In addition, the base station may perform a space division multiple access (SDMA) scheme based on state information of a channel between the base station and the UE.

A main purpose of the CoMP transmission is to improve communication performances of UEs located at cell boundary or node boundary. In 3GPP LTE, CoMP transmission scheme may be classified into two schemes.

1) Joint processing (JP) scheme: JP scheme is a scheme of transmitting data, which is shared by at least one node, for the UE. The JP scheme includes a joint transmission (JT) scheme and a dynamic point selection (DPS) scheme. The JP scheme is a scheme where a plurality of nodes simultaneously transmits data to one UE or a plurality of UEs in time-frequency resources. The plurality of nodes transmitting the data may be all or a part of a group capable of performing the CoMP transmission. The data may be transmitted coherently or non-coherently. Accordingly, quality of a received signal and/or a data throughput may be improved. The DSP scheme is a scheme where one node in a group capable of performing the CoMP transmission transmits data in time-frequency resources. In the DSP scheme, even if the data can be transmitted by a plurality of nodes simultaneously, but one node selected from the plurality of nodes transmit the data. A node transmitting the data or a muting node which does not transmit the data may be changed in a subframe unit. Further, an RB pair used in a subframe may be also changed. The DSP scheme may include a dynamic cell selection (DCS) scheme.

2) Coordinated scheduling (CS)/coordinated beamforming (CB) scheme: CS/CB scheme is a scheme in which only one serving node can transmit data and the remaining nodes coordinate with the serving node through scheduling or by reducing interference of a transmission beam, due to a problem such as a limited backhaul capacity. The CS/CB scheme includes a semi-static point selection (SSPS) scheme. The SSPS scheme is a scheme in which one node transmits data to a specific UE in a specific time. The node transmitting the data may be changed by a semi-static scheme.

Hereinafter, the concept of quasi co-location (QCL) is described.

In the CoMP situation in which one UE receives a downlink channel from a plurality of transmission points, the UE may receive a specific evolved PDCCH (EPDCCH) or a PDSCH scheduled by the EPDCCH from a specific transmission point via specific time resources and/or specific frequency resources or receive an EPDCCH or a PDSCH scheduled by the EPDCCH from another transmission point via other time resources and/or other frequency resources. At this time, if the UE can determine from which transmission point the channel is transmitted, channel reception performance can be improved using several attributes observed from the transmission point, e.g., large scale properties such as Doppler spread, Doppler shift, average delay, delay spread or average gain.

The eNB may signal the transmission point, from which a specific EPDCCH or a PDSCH scheduled by the specific EPDCCH are transmitted. As an example, the eNB may notify the UE that a specific EPDCCH or a PDSCH scheduled by the specific EPDCCH are quasi co-located (QCL) with a specific reference signal such as a CRS or a CSI-RS consistently transmitted by a specific transmission point. Here, QCL may mean that the channel has the same channel attributes as the specific reference signal in the long term. If information about QCL is not provided, the UE may assume that all channels are transmitted from a serving cell and are QCL with the CRS of the serving cell.

Accordingly, resource mapping of a specific EPDCCH or a PDSCH scheduled by the specific EPDCCH and transmission of other control channels such as a PCFICH, a PHICH and a PDCCH are selectively applicable depending on with which RS the channel is QCL.

Hereinafter, the detailed features related to reference signals (RSs) are described.

In general, a reference signal is transmitted as a sequence. Any sequence may be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink RS may be classified into a cell-specific reference signal (CRS), a multimedia broadcast and multicast single frequency network (MBSFN) reference signal, a UE-specific reference signal, a positioning reference signal (PRS), and a channel state information reference signal (CSI RS). The CRS is an RS transmitted to all UEs in a cell, and is used in channel measurement for a channel quality indicator (CQI) feedback and channel estimation for a PDSCH. The MBSFN reference signal may be transmitted in a subframe allocated for MBSFN transmission. The UE-specific RS is an RS received by a specific UE or a specific UE group in the cell, and may also be called a demodulation reference signal (DMRS). The DMRS is primarily used for data demodulation of a specific UE or a specific UE group. The PRS may be used for location estimation of the UE. The CSI RS is used for channel estimation for a PDSCH of a LTE-A UE. The CSI RS is relatively sparsely deployed in a frequency domain or a time domain, and may be punctured in a data region of a normal subframe or an MBSFN subframe. If required, a channel quality indicator (CQI), a precoding matrix indicator (PMI), a rank indicator (RI), etc., may be reported from the UE through CSI estimation.

A CRS is transmitted from all of downlink subframes within a cell supporting PDSCH transmission. The CRS may be transmitted through antenna ports 0 to 3 and may be defined only for $\Delta f=15$ kHz. The CRS may be referred to Section 6.10.1 of 3rd generation partnership project (3GPP) TS 36.211 V10.1.0 (2011-03) "Technical Specification Group Radio Access Network: Evolved Universal Terrestrial Radio Access (E-UTRA): Physical channels and modulation (Release 8)."

Figure 7:
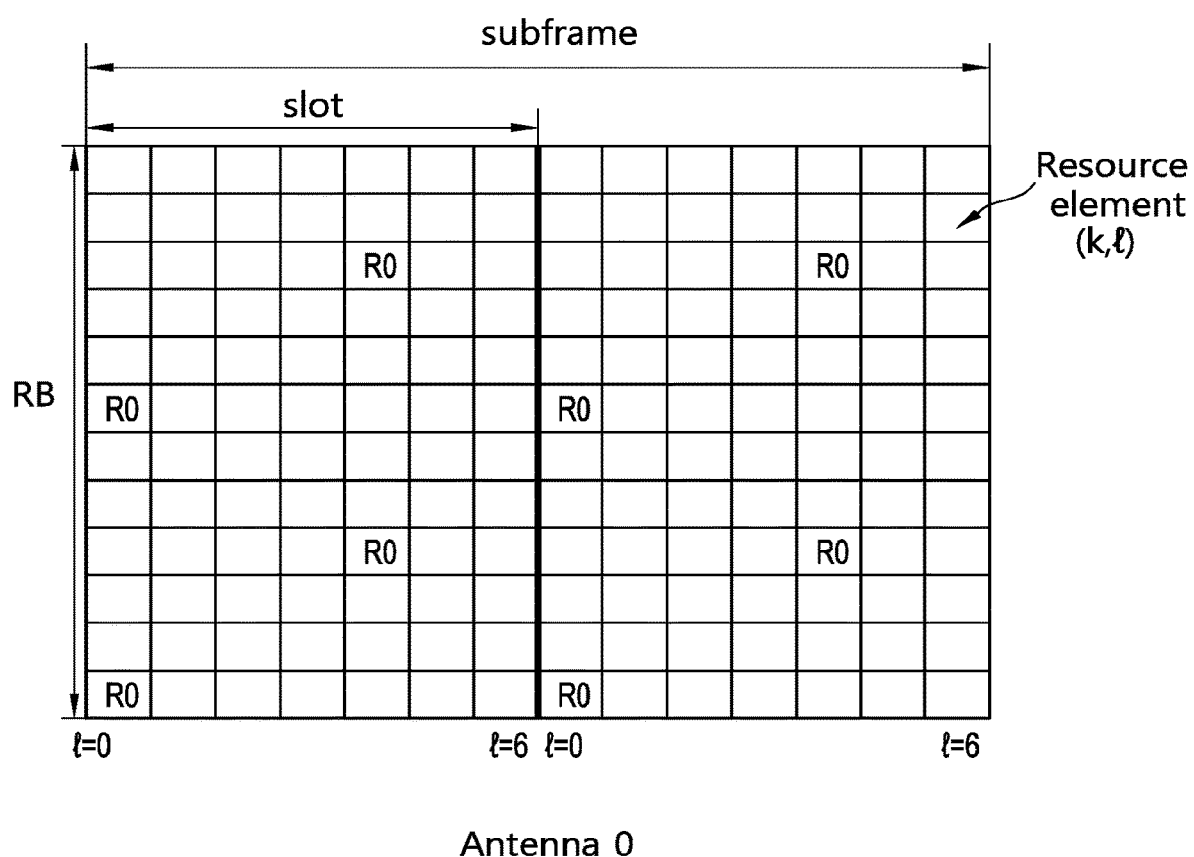
FIG. 7 shows one example of a pattern in which a CRS is mapped to an RB when a base station uses a single antenna port.
Figure 8:
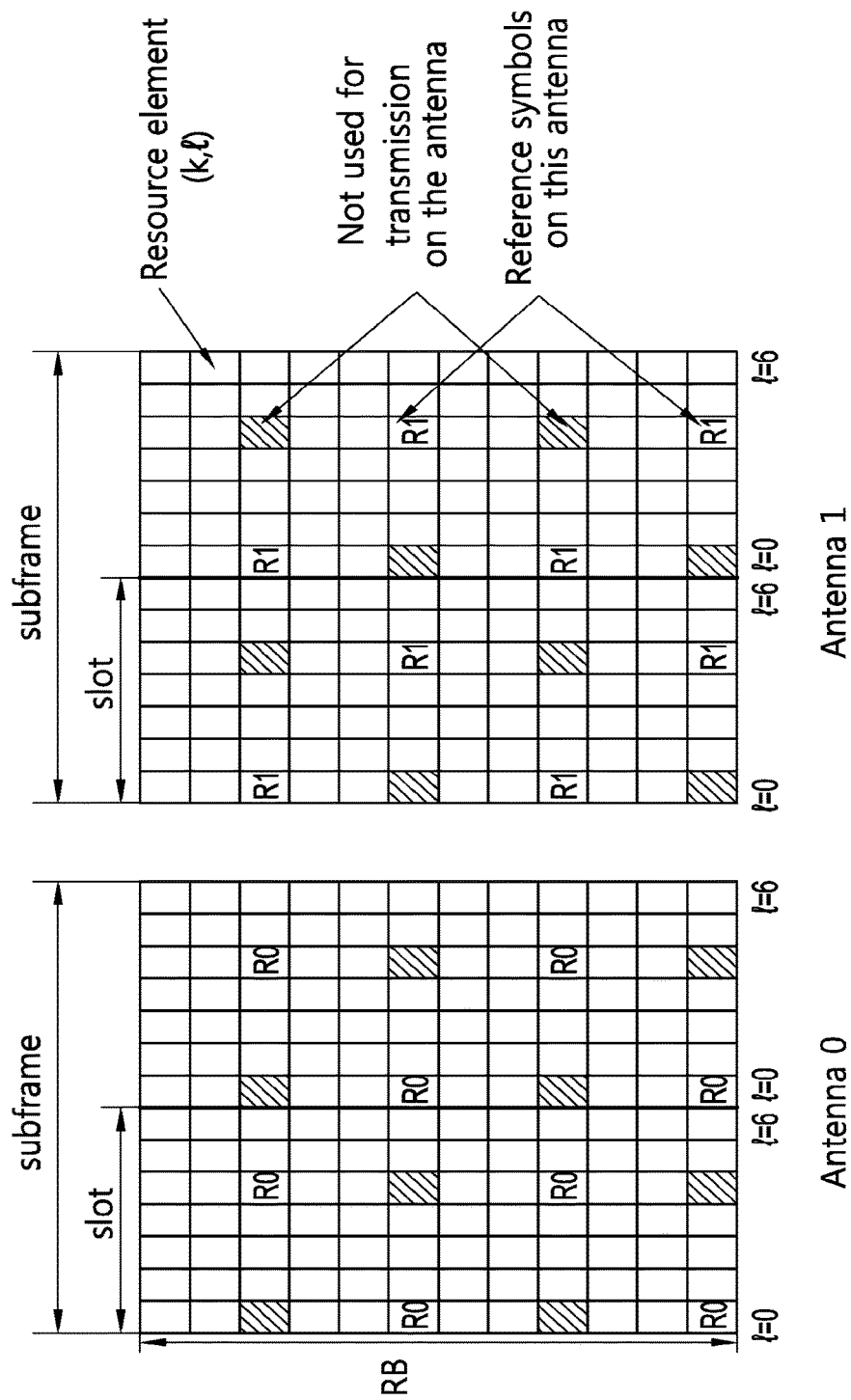
FIG. 8 shows one example of a pattern in which a CRS is mapped to an RB when a base station uses two antenna ports.
Figure 9:
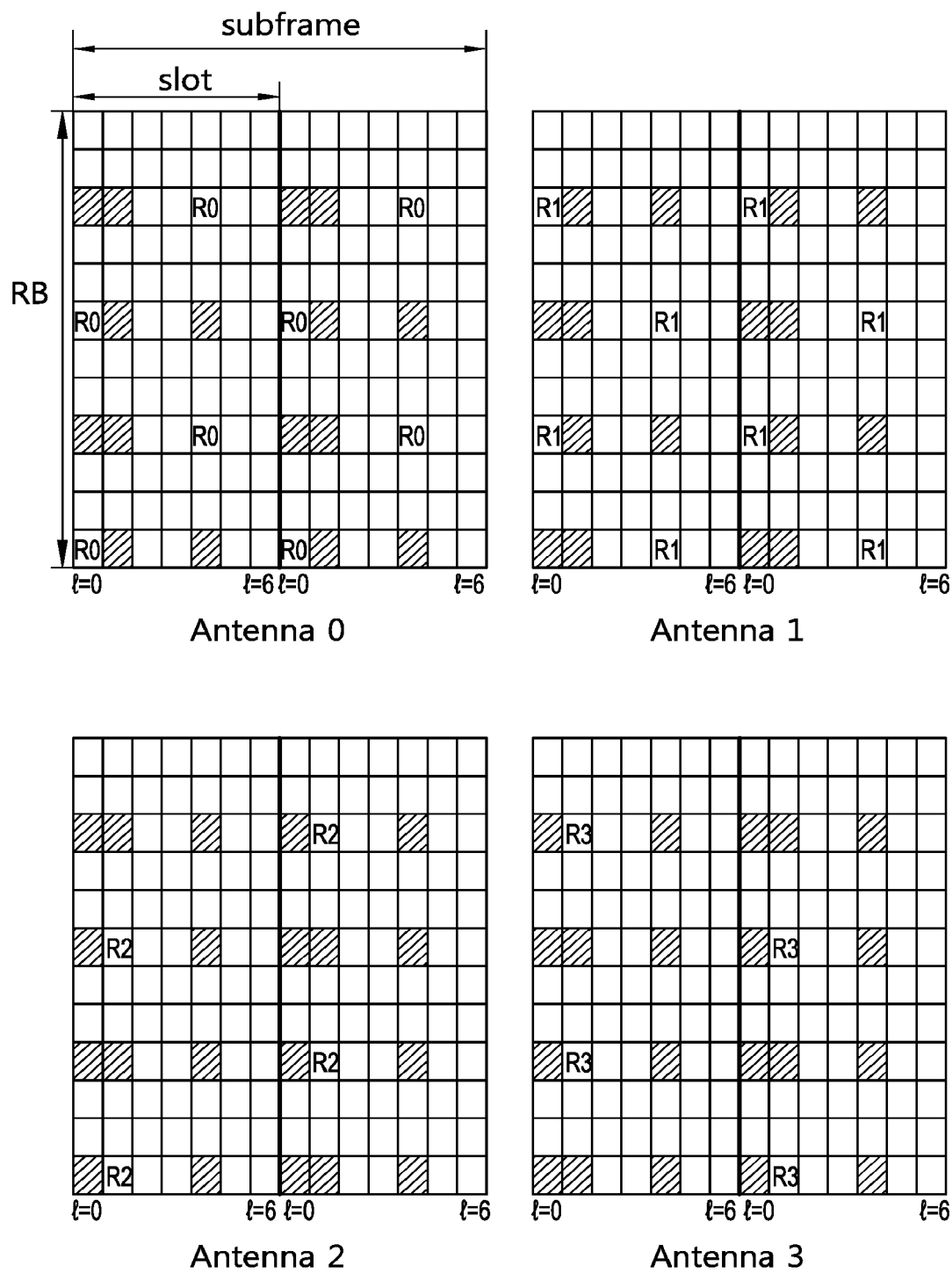
FIG. 9 shows one example of a pattern in which a CRS is mapped to an RB when a base station uses four antenna ports.

FIG. 7 shows one example of a pattern in which a CRS is mapped to an RB when a base station uses a single antenna port. FIG. 8 shows one example of a pattern in which a CRS is mapped to an RB when a base station uses two antenna ports. FIG. 9 shows one example of a pattern in which a CRS is mapped to an RB when a base station uses four antenna ports. The CRS patterns may be used to support features of the LTE-A. For example, the CRS patterns may be used to support coordinated multi-point (CoMP) transmission/reception technique, spatial multiplexing, etc. Also, the CRS may be used for channel quality measurement, CP detection, time/frequency synchronization, etc.

Referring to FIGS. 7 to 9, in case the base station carries out multiple antenna transmission using a plurality of antenna ports, one resource grid is allocated to each antenna port. "R0" represents a reference signal for a first antenna port. "R1" represents a reference signal for a second antenna port. "R2" represents a reference signal for a third antenna port. "R3" represents a reference signal for a fourth antenna port. Positions of R0 to R3 within a subframe do not overlap with each other. l, representing the position of an OFDM symbol within a slot, may take a value ranging from 0 to 6 in a normal CP. In one OFDM symbol, a reference signal for each antenna port is placed apart by an interval of six subcarriers. The number of R0 and the number of R1 in a subframe are the same to each other while the number of R2 and the number of R3 are the same to each other. The number of R2 or R3 within a subframe is smaller than the number of R0 or R1. A resource element used for a reference signal of one antenna port is not used for a reference signal of another antenna port. This is intended to avoid generating interference among antenna ports.

The CRSs are always transmitted as many as the number of antenna ports regardless of the number of streams. The CRS has a separate reference signal for each antenna port. The frequency domain position and time domain position of the CRS within a subframe are determined regardless of UEs. The CRS sequence multiplied to the CRS is also generated regardless of UEs. Therefore, all of UEs within a cell may receive the CRS. However, it should be noted that the CRS position within a subframe and the CRS sequence may be determined according to cell IDs. The time domain position of the CRS within a subframe may be determined according to an antenna port number and the number of OFDM symbols within a resource block. The frequency domain position of the CRS within a subframe may be determined according to an antenna port number, cell ID, OFDM symbol index (l), a slot number within a radio frame, etc.

A two-dimensional CRS sequence may be generated by multiplication between symbols of a two-dimensional orthogonal sequence and symbols of a two-dimensional pseudo-random sequence. There may be three different two-dimensional orthogonal sequences and 170 different two-dimensional pseudo-random sequences. Each cell ID corresponds to a unique combination of one orthogonal sequence and one pseudo-random sequence. In addition, frequency hopping may be applied to the CRS. The period of frequency hopping pattern may be one radio frame (10 ms), and each frequency hopping pattern corresponds to one cell identity group.

A CSI RS is transmitted through one, two, four, or eight antenna ports. The antenna ports used for each case is p=15, p=15, 16, p=15, . . . , 18, and p=15, . . . , 22, respectively. The CSI RS may be defined only $\Delta f=15$ kHz. The CSI RS may be referred to Section 6.10.5 of the 3rd generation partnership project (3GPP) TS 36.211 V10.1.0 (2011-03) "Technical Specification Group Radio Access Network; Evolved Universal Terrestrial Radio Access (E-UTRA): Physical channels and modulation (Release 8)."

A CSI RS sequences may be based on a pseudo-random sequence which is generated from a seed based on a cell ID. Regarding transmission of the CSI RS, a maximum of 32 configurations different from each other may be taken into account to reduce inter-cell interference (ICI) in a multi-cell environment, including a heterogeneous network (HetNet) environment. The CSI RS configuration is varied according to the number of antenna ports within a cell and CP, and neighboring cells may have the most different configurations. Also, the CSI RS configuration may be divided into two types depending on a frame structure. The two types include a type applied to both of FDD frame and TDD frame and a type applied only to the TDD frame. A plurality of CSI RS configurations may be used for one cell. For those UEs assuming non-zero power CSI RS, 0 or 1 CSI configuration may be used. For those UEs assuming zero-power CSI RS, 0 or more CSI configurations may be used.

Configuration of the CSI RS may be indicated by a higher layer, such as Radio Resource Control (RRC) signalling. In detail, CSI-RS-Config information element (IE) transmitted via the higher layer may indicate the CSI RS configuration.

The higher layer signalling can further define the period and the offset of the subframe in which the CSI RS is transmitted may be determined according to the CSI RS subframe configuration.

Figure 10:
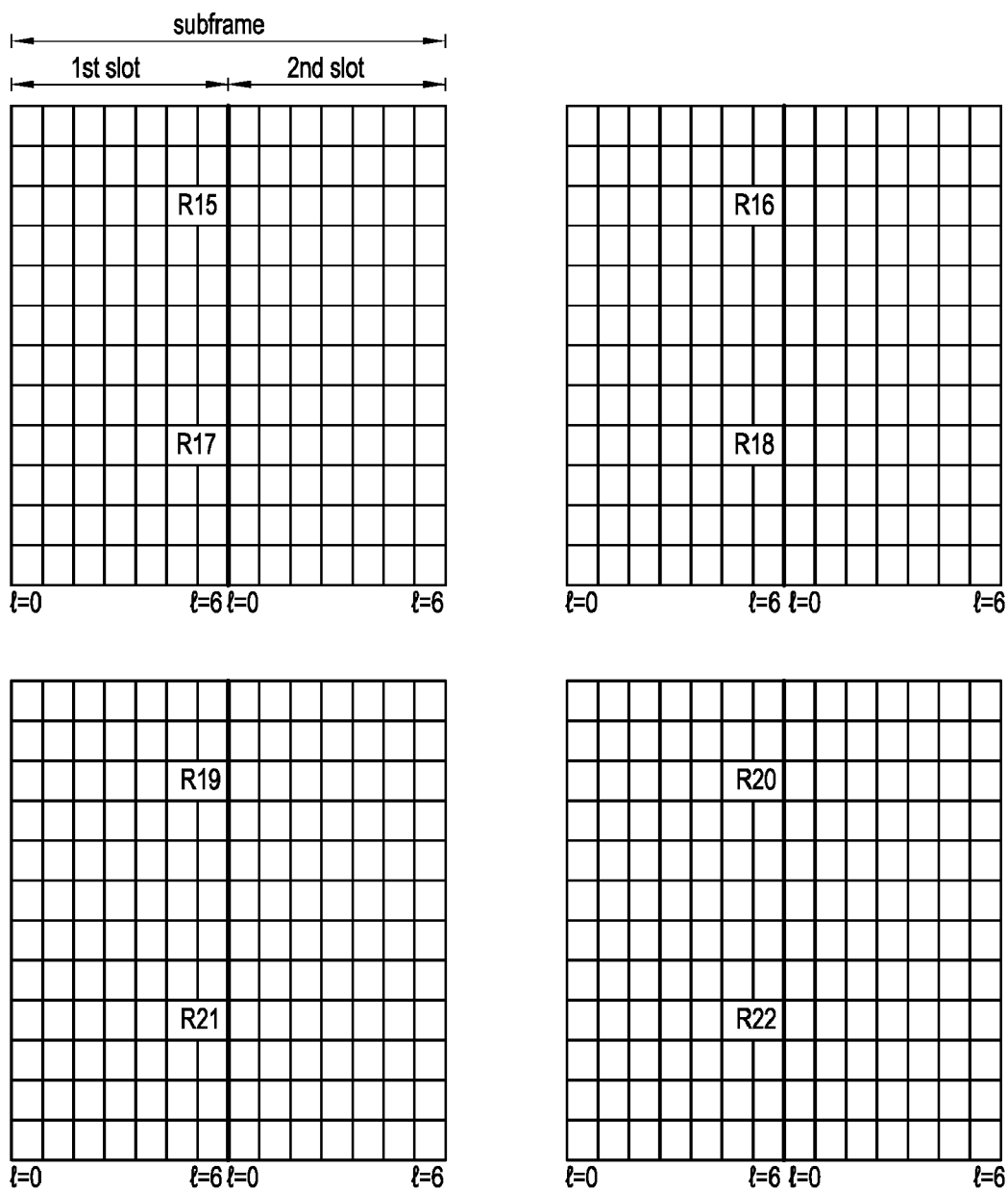
FIG. 10 shows an example of an RB to which a CSI-RS is mapped.

FIG. 10 shows an example of an RB to which a CSI-RS is mapped. In detail, FIG. 10 shows resource elements used for the CSI-RS in a normal CP structure when CSI RS configuration index is zero. Rp denotes resource elements used for CSI-RS transmission on an antenna port p. Referring to FIG. 10, the CSI-RS for an antenna port 15 and 16 are transmitted through resource elements corresponding to a third subcarrier (subcarrier index 2) of a sixth and seventh OFDM symbol (OFDM symbol index 5, 6) of a first slot. The CSI-RS for an antenna port 17 and 18 is transmitted through resource elements corresponding to a ninth subcarrier (subcarrier index 8) of a sixth and seventh OFDM symbol (OFDM symbol index 5, 6) of the first slot. The CSI-RS for an antenna port 19 and 20 is transmitted through the same resource elements as the CSI-RS for an antenna port 15 and 16 is transmitted. The CSI-RS for an antenna port 21 and 22 is transmitted through the same resource elements as the CSI-RS for an antenna port 17 and 18 is transmitted.

Hereinafter, detailed features related to a discover reference signal (DRS), which is associated with the above-explained small cells, are introduced. Namely, the following portions of the specification propose various features related to DRS, which is also referred to as a discovery signal, or advanced discovery signal. For instance, the present specification proposes detailed embodiments related to candidates which can be used as DRS. Further, the present specification proposes an embodiment with respect to alignment between a measurement gap and the DRS, an embodiment related to configuration related to measurement timing of the DRS, an embodiment with respect to misalignment between a number of cells, an embodiment with respect to enhanced Interference Mitigation & Traffic Adaptation (eIMTA), which dynamically changes Time Division Duplex (TDD) configuration in the context of DRS operations.

Here, a number of desired characteristics of the DRS (or interchangeably "advanced discovery signal") and a number of candidates for the DRS are proposed in detail.

In a dense small cell scenario, it is likely that a UE is connected with an overlaid macro and small cell may be used as for data offloading. In such a case, it is desirable for a UE to discover many cells within a communication range and then the overlaid macro layer selects the best cell considering "loading" information as well as other information. In other words, the best cell for data offloading may not be the best cell based on RSRP/RSRQ. Rather, a cell with low loading or many users may be desirable from overall cell management perspective. Thus, an advanced discovery procedure to allow detecting more cells than conventional mechanism can be considered.

In terms of desired characteristics of the DRS may include the following:
  detect more cells than legacy PSS/SSS/CRS based cell detection;
  detect cells in a short time such as in a subframe;
  perform measurement in a short time such as in a subframe; and
  support necessary measurement for fast time scale on/off operation.

Further, the candidates which can be considered for advanced discovery algorithm can include the following:
  PSS/(SSS)+CRS;
  PSS/(SSS)+CSI-RS;
  PSS/(SSS)+PRS;
  PSS+SSS+CRS+(CSI-RS);
  Combination of one or more options of (1)-(3); and
  PSS+SSS+CRS+(CSI-RS): in this case, a UE may assume that CSI-RS is present only if configured with CSI-RS configuration such as scrambling ID, the resource configurations for CSI-RS, etc. In other words, a UE may perform transmission point (TP) identification only if network assistance related to CSI-RS is configured or the explicitly configured with the presence of CSI-RS resource.

Although the candidates for the DRS are not limited to a certain example, it is preferable that the DRS comprises the PSS, SSS, and CRS. Further, the DRS may further comprise CSI-RS depending on the CSI-RS configuration (e.g., interval, offset of the CSI-RS).

It is expected that discovery signal (i.e., DRS) should be used for coarse time/frequency tracking, measurement and Quasi Co-Location (if necessary). Considering some of objectives, the design of discovery signal should meet the following requirements:
  (1) Discovery signal should support coarse time synchronization with assumption of very high initial timing error (such as +−2.5 ms);
  (2) Discovery signal should support coarse frequency synchronization with assumption of very high initial frequency error (such as 20 KHz);
  (3) Discovery signal should support the detectability of at least three cells (or transmission points); and
  (4) Discovery signal should support sufficient accuracy of measurement.

To support the items (1) and/or (2), it can be assumed that PSS and/or SSS can be transmitted.

In terms of designing discovery signals, the following questions should be answered:
  (1) In the same frequency, cells transmitting advanced discovery signal and cells not transmitting advanced discovery signals can coexist or not;
  (2) If a cell transmits advanced discovery signals, it will transmit discovery signals in off-state as well as in on-state?;
  (3) From a UE measurement reporting perspective, a UE reports both measurement reports based on legacy and advanced discovery signals if available or report only one? When it reports only one, what is the criteria to select one report?;
  (4) Whether a UE can perform measurement based on advanced discovery signal even in DRX mode ? (A) If this is supported, it may be required that a UE shall wake-up even in DRX cycle (not in OnDuration) to perform the measurement following DRS transmission timing/configuration. For example, if DRS is transmitted in every 160 msec, a UE shall wake up every 160 msec to perform the measurement;
  (5) How does multiplexing between discovery signals from different cells will be performed? Via TDM or FDM or CDM?;
  (6) Any active data transmission in subframe where discovery signal is transmitted? Without active data transmission, how to measure RSSI?;
  (7) Is there any necessity to increase the number of cell IDs from 504 to?;
  (8) What if SFN is not aligned among cells transmitting discovery signals together for efficient UE performance?;
  (9) What is CP length is not aligned among cells transmitting discovery signals together for efficient UE performance?;
  (10) What if discovery signal has been scheduled in MBSFN SF?;
  (11) Discovery signal transmission period and resource configuration should be configurable?; and
  (12) How to transmit discovery signal in TDD.

For a possible configuration, the periodicity of advanced discovery signals (i.e., the DRS) can be considered with the following constraints:
  (1) Multiple of measurement gap period: e.g., 40 msec, 80 msec, or 160 msec or 320 msec (if a new measurement gap period is configured, multiple of those new periods can be also considered);
  (2) Align with DRX cycle: 10, 20, 32, 40, 64, 80, 128, 160, 256, 320, 512, 640, 1024, 1280, 2048, 2560 (this constraint can be eliminated if a UE can measure using legacy signals for the serving cell); and
  (3) If PSS/SSS are transmitted in discovery signal, the periodicity of discovery signal may be multiple of 5 msec so that PSS/SSS transmitted for advanced discovery signal can be replaced by PSS/SSS transmitted in on-state. If discovery signal is not transmitted in on-state, this constraint can be eliminated. Or to avoid impact on legacy UE, different periodicity not aligned with PSS/SSS can be also considered such that PSS/SSS can be transmitted during on-state while additional PSS/SSS can be also transmitted for discovery signal transmission. If DRS-PSS and DRS-SSS are additionally transmitted separately from PSS/SSS transmitted in on-state, the cell ID between DRS-PSS/DRS-SSS can be different from PSS/SSS. Also, QCL relationship between DRS-PSS/DRS-SSS and PSS/SSS may not be assumed. In that case, a QCL relationship DRS-CSI-RS (or DRS-CRS) and PSS/SSS and/or CRS can be configured where DRS-CSI-RS can be used for PSS/SSS and/or CRS decoding/tracking. In that case, the cell ID used for DRS-CSI-RS and PSS/SSS and/or CRS may be assumed to be equal. If the cell ID used for DRS-PSS/DRS-SSS is same to that of PSS/SSS, DRS-PSS/DRS-SSS can be replaced by SSS/SSS if DRS-PSSS/DRS-SSS collide with PSS/SSS if two collide. Otherwise, PSS/SSS may be dropped when two collide.

As discussed above, it is preferable the periodicity of the DRS is set to be a multiple of the measurement gap period. In this specification, the "multiple" also includes the same value. Accordingly, if the measurement gap period is set to 40 ms and one same measurement gap period is configured, it is preferable that the periodicity of the DRS is set to one of 40 msec, 80 msec, 160 msec. Based on the present specification, UEs may measure the DRS within the measurement gap, and thus the DRS period can be aligned with the measurement gap if the periodicity of the DRS is set to be a multiple of the measurement gap period.

current requirement. This can be done in general by increasing measurement interval or shorten the measurement gap. This needs to be considered from two aspects. One from configuring measurement gaps for discovery signals and the other from configuring measurement gap for legacy discovery signals. Following current RAN4 requirement, a UE is required to detect a new FDD cell within the following formula.

$$T_{Identify\_Inter} = T_{Basic\_Identify\_Inter} \cdot \frac{480}{T_{Inter1}} \cdot N_{freq} \text{ ms} \quad \text{[Math FIG. 3]}$$

Where:

T_Basic_Identify_Inter=480 ms. It is the time period used in the inter frequency equation where the maximum allowed time for the UE to identify a new FDD inter-frequency cell is defined.

N_freq is defined in section 8.1.2.1.1 and T_inter1 is defined in section 8.1.2.1 in 3GPP TS 36.133 V10.1.0 (2010-12).

The following table is defined in 3GPP standard documents.

TABLE 1

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) | Measurement Purpose |
| --- | --- | --- | --- | --- |
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

Furthermore, in terms of feasible subframe where discovery signal can be transmitted, both TDD and FDD, MBSFN subframes need to be removed from the candidate list. Thus, discovery signal may not be transmitted in MBSFN subframe based on another possible aspect of the present specification.

Hereinafter, features related measurement gaps and measurement requirements for a UE with the DRS are explained in detail.

The motivation of making discovery signal aligned with measurement gap period is to allow "same measurement gap" applicable for inter-frequency measurement regardless of whether the measurement is based on legacy signal or new discovery signal. Otherwise, a UE may need to be configured with two different measurement gap patterns which may not be desirable due to service interruption and performance impact. When one or more additional measurement gap are configured to UEs, some constraints can be considered to limit the same amount of UE interruption time or not to increase UE service interruption time from the For example, with measurement gap of 40 msec, a UE should find a new frequency with 480*480/60*7=480*8*7. In other words, 8 measurements are used for inter-frequency measurement for a frequency where 7 frequencies are searched. When discovery signal (i.e., DRS) is introduced, a UE may be expected to perform cell detection by reading one or a few discovery signals. In that case, the requirement for a UE with discovery signal would be 480*(480*Number of DRS bursts required for detection/DRS interval)*N_freq where*N_freq may represent either the number of frequency layer with DRS only or both DRS and CRS.

Namely, when determining UE requirements associated with the measurement latency on the DRS, the interval of the DRS (i.e., periodicity of the DRS) can be used.

In another aspect of the present specification, the measurement gap can be defined in the following manners.

When discovery signal is introduced where the measurement gap is not aligned with legacy UE, to meet the service interruption time intact, the requirement on cell detection using legacy signals would need to be tailored.

One approach is to use "minimum available time" for inter-frequency for CRS based cell detection or other RAT can be reduced (where the measurement interval or pattern may also change).

For example, the following table can be proposed in the present specification.

TABLE 2

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) | Measurement Purpose |
| --- | --- | --- | --- | --- |
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 6 | 160 | 15 | Inter-Frequency E-UTRAN FDD and TDD, UTRAN FDD, GERAN, LCR TDD, HRPD, CDMA2000 1x (not based on discovery signal) |
| 3 | 3 | 80 | 15 | Inter-Frequency E-UTRAN FDD and TDD, UTRAN FDD, GERAN, LCR TDD, HRPD, CDMA2000 1x (not based on discovery signal) |

For example, instead of configuring gap pattern 0 or 1 only, new gap patterns can be considered as shown in above where the minimum available time used for other procedures than DRS based measurement can be limited which allows the remaining time used for discovery signals. For example, during 480 msec, inter-frequency measurement using discovery signals would require 6*2 (6 msec measurement gap with 2 times of DRS detection) for a frequency is needed and a UE needs to monitor 3 frequencies with DRS, the total time used for DRS is 12*3=36 msec. Thus, available time for legacy signal based measurement should be reduced (such as 2 or 3) by either relaxing measurement gap period or measurement gap.

When DRX is configured, the similar requirement is applicable.

Another option to determine requirement with DRS is to use OTDOA requirement as shown in below. In other words, TPRS can be changed to TDRS with the interval of DRS transmission and M can be the number of samples to read.

All inter-frequency RSTD measurement requirements specified in Sections 8.1.2.6.1-8.1.2.6.4 (of 3GPP TS 36.133) shall apply when the measurement gap pattern ID #0 specified in Section 8.1.2.1 (of 3GPP TS 36.133) is used.

All inter-frequency RSTD measurement requirements specified in Sections 8.1.2.6.1-8.1.2.6.4 (of 3GPP TS 36.133) shall apply without DRX as well as for all the DRX cycles specified in 3GPP TS 36.331. More detailed features related to the above operation can be referred to Section 8.1.2.6.1 of 3GPP TS 36.133 V10.1.0 (2010-12).

To align discovery signal transmissions from cells in a frequency, similar to PRS, the following may be assumed. In detail, the following "DRS" field can be further defined based on the following language.

DRS

This field specifies the DRS configuration of the neighbour cell.

When the EARFCN of the neighbour cell is the same as for the assistance data reference cell (or another neighbor cell), the target device may assume that each DRS occasion in the neighbour cell at least partially overlaps with a DRS occasion in the assistance data reference cell where the maximum offset between the transmitted DRS occasions may be assumed to not exceed half a subframe. Alternatively, the target device may assume each DRS occasion in the neighbour cell does not overlap with the DRS occasion when the DRS occasion is set to 1 msec.

Additionally or alternatively, the target device may assume the DRS is transmitted during a DMTC duration whose maximum is set to 6 msec as configured by a network via a high layer signalling. Accordingly, the UE may assume that the DRS is transmitting with in a window of 6 msec and further assume that the maximum of the offset of the DRS is 5 ms.

When an evolved absolute radio-frequency channel number (EARFCN) of the neighbour cell is the same as for the serving cell (or other cell), the target may assume that this cell has the same PRS periodicity (Tprs) as the assistance data reference cell.

In other words, a UE may assume that DRS transmissions from multiple cells in a frequency is aligned in terms of period and offset.

More specifically, triggering discovery signal based measurement for inter-frequency may be configured only with measurement gap pattern #0 where the network may align transmission of discovery signals to be aligned with UE measurement gap pattern.

If a UE is configured with both OTDOA and DRS, it would not be easy to align all measurements by one measurement gap pattern. Thus, in general, it is worthwhile to consider configuring one or more measurement gap patterns for the UE which the serving cell should be aware of. However, in this case, not to increase UE overhead, relaxing legacy measurement including OTDOA (by extending measurement period) may be necessary. Or, similar to OTDOA, a UE should be configured with only one measurement gap which is used for both DRS and CRS (as well as OTDOA) measurements if needed. However, this may restrict the deployment use cases for DRS based discovery procedure. Thus, in general, consideration of relaxing UE measurement gap along with allowing multiple measurement configurations are preferred where at least some coordination among small cells within a cluster is assumed (i.e., the above-explained assumption related to DRS occasion is also applicable here.). This may be extended to the same frequency. Among different frequencies, a UE may be configured with different offset of measurement gap starting which the serving cell configures in multiple different ways.

One is to change the measurement gap pattern such to include multiple offset values with larger measurement period or a UE may be configured with multiple measurement gaps.

Additionally or alternatively to the above operation, a UE can be also configured with a set of DRS configurations which includes information on period, offset, the duration, and potentially RS type. In this case, period and duration can be optional whereas offset may be mandated or optional (if the field is not present, UE can assume SFN and subframe offset is aligned between the target cells and the serving cell). If period is not present, UE may assume a prefixed value such as 40 msec or 80 msec.

When a measurement gap (or multiple measurement gaps) are configured, a UE can perform only DRS based measurement on those configured gaps for discovery signal based measurements.

Detailed features related to the above operation are explained as follows.

Figure 11:
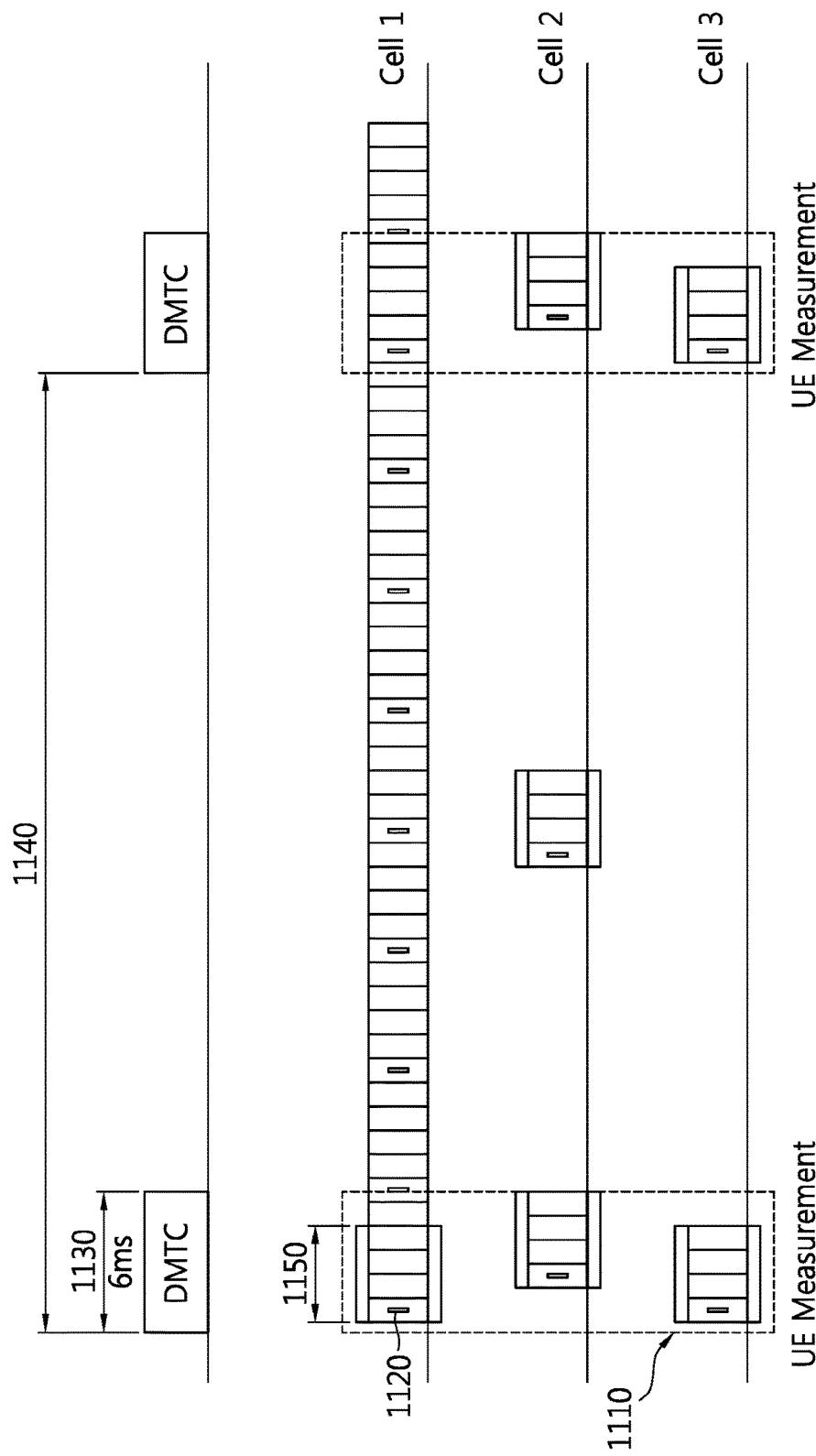
FIG. 11 shows an example of UE measurement performed on the DRS according to one example of the present specification.

FIG. 11 shows an example of UE measurement performed on the DRS according to one example of the present specification. As depicted, a UE can be configured to measure at least one cell, e.g., small cells supporting power on/off operations. In FIG. 11, cell 1 is on-cell which is always "on" whereas cells 2-3 perform periodic on/off operations. As discussed above, it is preferable that the period of the DRS is aligned with the measurement gap, and thus the UE can be configured to measure the DRS within the measurement gap. Further, as discussed above, a length of the measurement gap 1130 in FIG. 11 can be set to 6 ms and a repetition period of the measurement gap can be set to 40 ms or 80 ms, and thus a measurement period of the DRS 1140 in FIG. 11 can be set to 40 msec, 80 msec, or 160 msec. Since the candidates of the DRS may include the PSS, SSS, CRS, and optionally CSI-RS, the UE can be configured to measure the PSS, SSS, CRS, and CSI-RS during a certain measurement duration based on the "DRS configurations" delivered via an RRC message. Since the DRS configurations are delivered via the RRC message, the DRS configurations are delivered to the UE which is in an RRC connected mode.

As discussed above, each set of DRS configurations may include information on period, offset, the duration used for DRS measurement. The information on period included in each set of DRS configurations may indicate a measurement period of the DRS, and an offset of the measurement period. Accordingly, a starting point of a duration where the UE possibly measures the DRS can be determined based on the information on period and offset. However, actual measurement on the DRS starts with SSS (depicted in 1120 of FIG. 11). In detail, the measurement on the DRS starts on a first subframe carrying the SSS in each period of the measurement period. The UE's measurement on the DRS lasts during subframe(s) determined based on the "duration" included in each set of DRS configurations. In FIG. 11, the duration 1150 is set to 4 ms, and thus the measurement on the DRS lasts during 4 subframes. The maximum of the duration 1150 can be set to 5 ms in the present specification.

It is preferable that each set of DRS configurations is defined per frequency. In other words, a single and same DRS configuration can be defined for an individual frequency, and such DRS configurations can be applicable to any cell using the same frequency. Further, if the DRS configuration is defined for a specific frequency among a plurality of available frequencies, the UE may only perform DRS measurement for the specific frequency configured for the DRS and perform legacy measurement for the remaining frequencies. When performing legacy measurement for the remaining frequencies, the UE's measurement is not restricted to interval/offset/duration included in the DRS configuration. Accordingly, UE may continuously (if possible) measure the conventional PSS, SSS, CRS for the remaining frequencies, which are not configured with the DRS measurement.

Another aspect to consider is DRX cycle which is more tricky as it may not easy to setup a periodic discovery signal transmission which is aligned with all DRX cycles. Thus, it can be assumed that a UE may wake up during DRX cycle aligned with discovery signal transmission interval such that it can perform measurement. In other words, if a UE is configured with a measurement gap (which may be additional measurement gap from the measurement gap configured for inter-frequency measurement using legacy signals), it may be assumed that UE will perform measurement regardless of its DRX states. In this case, it can be further assumed that a UE may select any discovery signal interval or measurement gap to perform measurement with the constraint that at least one measurement per DRX cycle is taken. For example, if DRX cycle is 1280 msec where measurement gap is configured every 80 msec, whether the UE performs the measurement one or more time can be up to the UE implementation as long as it performs the measurement at least once per DRX cycle to satisfy the requirement. When a UE can create autonomous gap, the timing information of network assistance for advanced discovery procedure can be used to determine when to perform the measurement.

1. Design of PSS/SSS Sequence

First, the design choices of signal generation of PSS and/or SSS are described.

To avoid detection of PSS/SSS by legacy UEs, it is desirable to use different resource in terms of time and frequency between legacy PSS/SSS and PSS/SSS for DRS in advanced discovery procedure. Furthermore, it is also considerable to use different code shown in the following table.

TABLE 3

| $N_{ID}^{(2)}$ | Root index (off-state) | Root index (on-state) |
|---|---|---|
| 0 | a | 25 |
| 1 | b | 29 |
| 2 | c | 34 |

Where a, b, and c are different numbers from 25, 29 and 34. This would increase the complexity of advanced UE in terms of cell search/synchronization. However, this will allow preventing legacy UEs from detecting advanced discovery signals.

Furthermore, it may not be sufficient to perform coarse time/frequency tracking using single-shot PSS transmission. Thus, it would be desirable to consider multi-shot PSS transmission where PSS transmission can be occurred in a burst fashion such that consecutive PSS transmissions can be occurred over the multiple subframes or a UE may acquire coarse time synchronization using multiple incidents of PSS transmission. If the latter is used, the periodicity of PSS transmission should not be very long. For example, at least measurement gap interval (40 msec or 80 msec) may be used as a periodicity such that PSS will be transmitted in every 40 mesc or 80 msec. If SSS is used for frequency tracking and/or time tracking, the similar approaches for SSS can be applied as well.

When PSS/SSS is transmitted, to enhance the cell detection performance, a few approaches can be considered.

Figure 12:
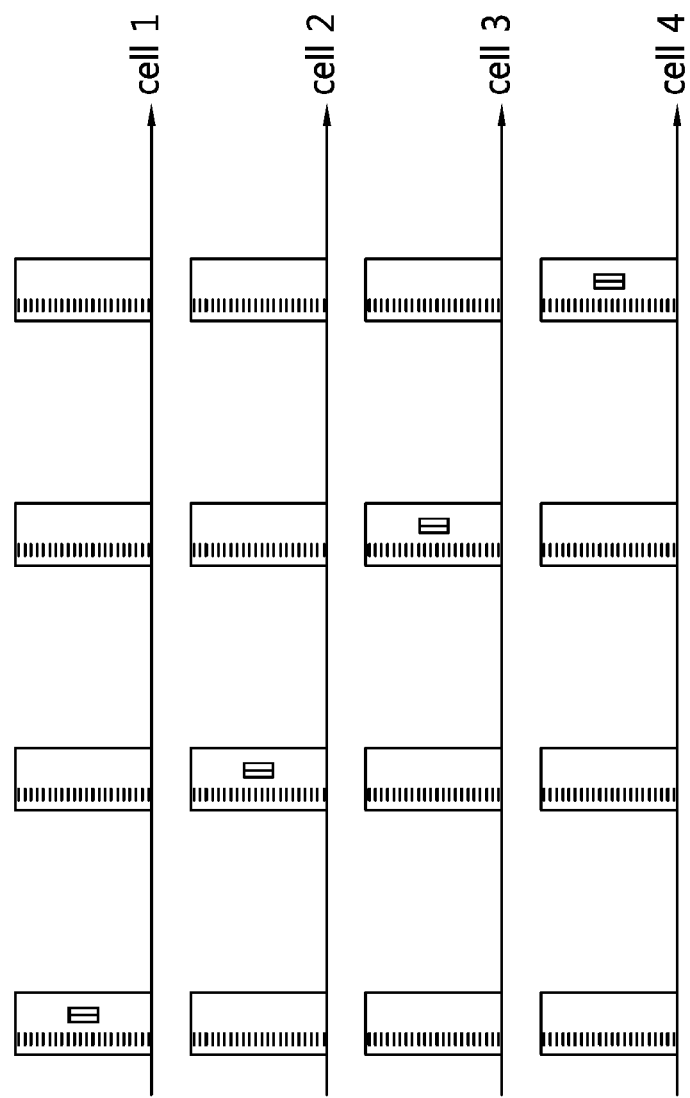
FIG. 12 shows an example of PSS/SSS time-divisional multiplexing.

(1) SFN transmission of PSS and/or SSS from multiple cells within a cluster (2) Only a few cell transmits PSS and/or SSS (3) PSS/SSS muting or ICIC: when discovery signal consists of PSS/SSS/CSI-RS (for example, but not limited to this combination), to enhance the multiplexing capability of PSS/SSS, TDM approach among multiple cells can also be considered. For example, if discovery signal is transmitted (cell ID detection signals) every 200 msec where the measurement RS such as CSI-RS may be transmitted more frequently such as 40 msec, PSS/SSS may be transmitted in every 200 msec whereas CSI-RS is transmitted every 40 msec. In the first 40 msec interval, cell 1 may transmit PSS/SSS/CSI-RS whereas other cells transmit only CSI-RS, in the second 40 msec interval, cell2 may transmit PSS/SSS/CSI-RS whereas other cells transmit only CSI-RS and so on. By this way, the interference on PSS/SSS can be minimized where measurement can be performed for a cell which is discovered by cell detection procedure. This is similar to the case where PSS/SSS is transmitted every 5 msec whereas CRS is transmitted in every subframe for measurement. From a UE measurement perspective, a UE may select any incidents of CSI-RS (or CRS) transmission for its measurement if only one measurement is performed in every 200 msec. Instead of TDM across subframes, TDM within a subframe or FDM can be also considered where PSS/SSS can be transmitted in different OFDM symbols by shift OFDM symbol per cell (or shift value may be tied with cell ID) or shift the transmission frequency. The example is shown in FIG. 12. Instead of transmitting PSS/SSS infrequently only, all the RS can be transmitted infrequently where different cell may take different interval to transmit the set of discovery signals. For example, in the figure, cell1 may transmit PSS/SSS/CSI-RS in first 40 msec interval whereas cell2 may transmit PSS/SSS/CSI-RS in second 40 msec interval. If this approach is used, the same CSI-RS configuration among different cells or CRS pattern can be used where TDM is used among multiple cells to increase the orthogonality. This can be viewed as "offset" with the fixed discovery signal transmission period where discovery signal transmission from each cell uses different offset value.

(4) Information for PSS and/or SSS cancellation ? the list of cell IDs can be configured to a UE where a UE may perform PSS and/or SSS cancellation within the list of cell IDs (which may improve the cancellation performance).

Note that all proposed ideas here applicable to CSI-RS can be applicable to CRS in case DRS consists of PSS/SSS/CRS.

Considering legacy UE impact on transmitting potentially additional PSS/SSS which may be covered by legacy ZP CSI-RS configuration, it is desirable to transmit PSS/SSS in OFDM symbol 2 and 3 in the second slot where the entire RB can be covered by a ZP CSI-RS configuration for normal CP FDD/TDD. For normal CP TDD, OFDM symbol 1 and 3 can be used where the entire RB can be covered by non-ZP CSI-RS configurations (and thus a ZP CSI-RS configuration can cover the PSS/SSS transmission for discovery signal). For extended CP, OFDM symbol 4/5 for TDD/FDD can be considered and OFDM symbol 1/3 can be considered for TDD in second slot. If CSI-RS is not configured to a legacy UE, a ZP CSI-RS configuration is configured according to discovery signal transmission interval (for example, every 40 msec, a ZP CSI-RS configuration is configured). When discovery signal consists of CSI-RS as well, there are a few examples of transmitting discovery signal CSI-RS can be considered.

Figure 13:
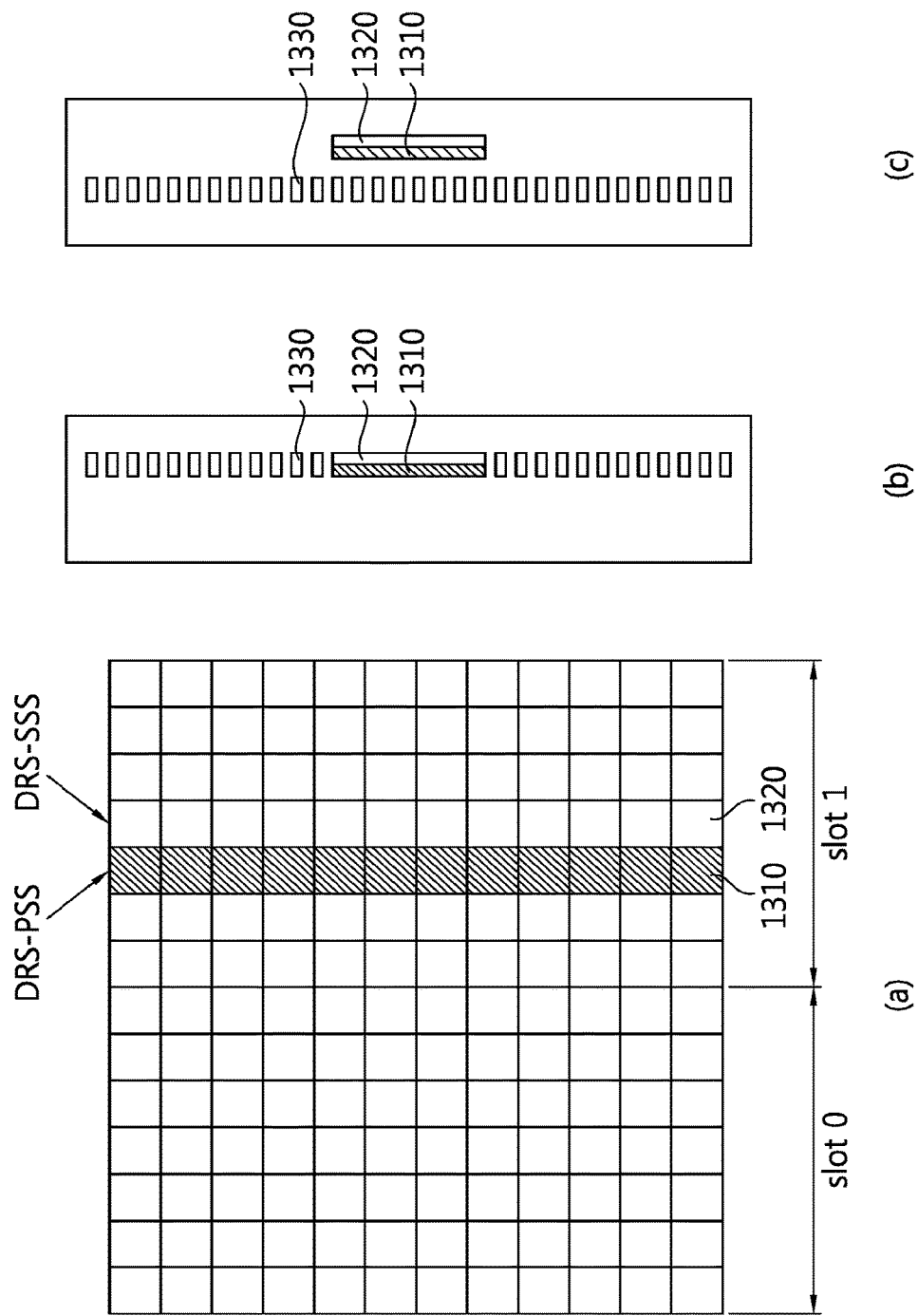
FIG. 13 shows another example of PSS/SSS time-divisional multiplexing.

(1) If system bandwidth is larger than 1.4 Mhz and CSI-RS is transmitted over the entire system bandwidth or larger than 1.4 Mhz bandwidth (for discovery signal transmission), it can be considered to "omit" CSI-RS transmission when CSI-RS is colliding with PSS/SSS (for a convenience, let's call DRS-CSI-RS as CSI-RS used for discovery signal and DRS-PSS/DRS-SSS as PSS/SSS used for discovery signal). This means that DRS-CSI-RS can be omitted if it collides with DRS-PSS/DRS-SSS. Thus, DRS-CSI-RS will be transmitted over the entire system bandwidth (or configured system bandwidth) potentially except for the center 6 PRBs where DRS-PSS/DRS-SSS is transmitted. This will be applicable when DRS-CSI-RS will be transmitted in the same OFDM symbol where DRS-PSS/DRS-SSS is transmitted. The example is shown in FIG. 13. (In FIG. 13, a first case where DRS-CSI-RS 1330 collides with DRS-PSS 1310 and DRS-SSS 1320 and a second case where DRS-CSI-RS 1330 does not collide with DRS-PSS 1310 and DRS-SSS 1320 are depicted) If system bandwidth is 1.4 Mhz, to transmit DRS-CSI-RS with other signals, either different CSI-RS configuration not colliding with other signals is used or different subframe needs to be used for DRS-CSI-RS transmission.

(2) Regardless of system bandwidth, always DRS-CSI-RS may not be transmitted where DRS-PSS/DRS-SSS is transmitted in any PRB in the same OFDM symbol. For example, if PSS is transmitted in OFDM symbol 2 of second slot, CSI-RS configuration spanning OFDM symbol 2 of second slot will not be used for DRS-CSI-RS configuration.

In the above passage, DRS-PSS, DRS-SSS, DRS-CRS, DRS-CSI-RS, and DRS-PRS indicate PSS, SSS, CRS, CSI-RS and PRS included in the DRS, respectively. In one aspect of the present specification, the above-mentioned RSs may be similar to conventional RSs in terms of sequence-generation, but different waveforms may be used. In detail, the conventional PSS and DRS-PSS can be transmitted via a same waveform, whereas transmission scheme or resource allocation may be differently applied to the both PSSs. Accordingly, depending on the transmission scheme of the DRS-PSS, the UE may assume that the DRS-PSS is same as the conventional PSS in some aspect. This is also applicable to the conventional SSS and the DRS-SSS. Accordingly, the conventional SSS and DRS-PSS may be different in terms of sequence-generation and resource-allocation.

When CSI-RS is used for DRS, it is also feasible that a UE can be configured with CSI-RS configuration mainly for CSI measurement. If DRS-CSI-RS configuration and CSI-RS configuration is the same for a specific cell, both CSI-RS may be used for CSI measurement. Unless noted otherwise, a UE may assume that only CSI-RS configuration configured for CSI measurement is used for CSI measurement.

If DRS-CSI-RS is not transmitted when DRS-CSI-RS collides with DRS-PSS or DRS-SSS, for measurement DRS-PSS and/or DRS-SSS can be also used. For example, to measure RSRP, all the REs carrying DRS can be used to perform measurement. For RSSI measurement, this can be different where RSSI may be measured only in OFDM symbols configured to measure RSSI or the entire subframe. However, considering a case where DRS-PSS/DRS-SSS are transmitted in a SFN manner by multiple cells (and thus the power is accumulated), it can be also considered not to consider DRS-PSS and/or DRS-SSS in RSRP-like measurement. Or, the behavior can be configured by the network as well whether to include those REs for measurement or not. Generally, if the cell ID used for DRS-CSI-RS and DRS-PSS/DRS-SSS is identical, both RS may be used for measurement. Otherwise, only one type of RS is used for measurement. In different way is that the RS used for cell detection/verification is used for measurement. If DRS-CSI-RS is used cell verification finally where the partially DRS-PSS/DRS-SSS is used for cell ID detection, only DRS-CSI-RS is used for measurement.

If CRS is used for discovery signal, this kind of problem may not exist. Further to reduce the impact on legacy UEs, the subframe where discovery signals are transmitted can be configured as MBSFN subframes.

2. Design of CRS or CSI-RS or PRS Used for Cell ID and Measurement

Even though PSS/SSS may be transmitted infrequently, CRS or CSI-RS or PRS used for measurement may need to be transmitted more often. Thus, when discovery signal consists of multiple signals (e.g., PSS/SSS+CSI-RS), the interval/duration of transmitting one signal can be different from the interval/duration of transmitting another signal. In other words, the interval of discovery signal transmission may be fixed, yet, whether multiple signals will be present in one episode of discovery signal transmission or not can be different. One example is to transmit one PSS/SSS in every 40 msec whereas CRS or CSI-RS will be transmitted in every subframe (in relation to MBSFN SF) for m subframe (e.g., m=6). Or, more specifically, PSS/SSS can be transmitted in every 40 msec of subframe #0/#5 (i.e., twice per 40 msec) and CRS/CSI-RS may be transmitted more frequently than PSS/SSS or following the current configuration (e.g., CRS=continuous over m subframes, CSI-RS following configured period).

When discovery signal (i.e., the DRS) consists of multiple signals, QCL relationship among signals can be considered. For example, if PSS/SSS and CRS or CSI-RS or PRS are used for discovery signals, PSS/SSS antenna ports and CRS or CSI-RS or PRS antenna ports can have QCL relationship w.r.t. large scale properties such as average delay, delay spread, Doppler spread and Doppler shift (or a subset of properties). In other words, if PSS/SSS included in the DRS is used for coarse time/frequency tracking, the signals used for coarse time/frequency tracking may have QCL relationship with signals used for cell identification or measurement. Also, RS for cell identification can have QCL relationship with RS used for measurement. Explicit signaling of QCL relationship or behavior (such as QCL behavior A or B) can be considered to a UE via higher layer signaling. Or, a mapping between cell ID used by PSS/SSS and CSI-RS or CRS or PRS can be signaled.

3. Discovery Signal Design

Hereinafter, features related to signal designs of DRS are explained in detail. The following features are beneficial when RSs included in the DRS have modified features in view of the conventional RSs.

When designing signals including PSS, SSS and CSI-RS, the following issues should be considered:

Due to heavy interference on PSS/SSS, it would be considered to use "SFN-ed" transmission of PSS/SSS if cancellation may not work perfectly or PSS/SSS muting is not used;

In other words, PSS/SSS are used for time/frequency tracking and actual cell ID search may be performed based on CSI-RS;

To minimize the number of cell ID detections (hypothesis), further consideration of shared cell ID among cells in a small cell cluster where virtual cell ID can be configured for CSI-RS where virtual cell ID can be driven by cell ID used for PSS/SSS. For example, virtual cell ID would be [physical cell ID+min_ID, physical cell ID+max_ID] where physical cell ID is used for generating PSS/SSS;

Depending on the quality of SSS, either one or two (or more) SSS sequences can be transmitted; and Considering the UE power consumption and reliability, it can be further considered to transmit more than one DRS-PSS and/or DRS-SSS pair in one discovery signal transmission.

In terms of the location of DRS-PSS and/or DRS-SSS, to avoid detection of DRS by legacy UEs, and also to enhance the multiplexing capability, a new location different from Rel-8 PSS/SSS location can be considered. As shown in FIG. 13, one example would be to utilize OFDM symbol 2/3 in second slot in normal CP. To make a different gap from FDD, DRS-PSS/DRS-SSS can be placed in OFDM symbol 2/3 respectively. Furthermore, since a UE expects to receive system information via higher layer signaling or by receiving system information broadcast once the cell is detected (and the target cell wakes up), there is no need to take a different gap between FDD/TDD. Thus, we propose to use the same gap between DRS-PSS/DRS-SSS regardless duplex. Furthermore, instead of DRS-PSS/DRS-SSS combination, the following combinations can be also considered.

(1) DRS-PSS0/DRS-PSS1 where PSS0 and PSS1 can have different code (generated by different root indices); and (2) DRS-PSS/DRS-SSS0/DRS-SSS1 where SSS0 and SSS1 can be generated as if it is transmitted in subframe #0/#5 in Rel-8 SSS sequence generation.

Candidate locations of DRS-PSS/DRS-SSS would be to avoid collision with:

(1) PDCCH (at least one or two OFDM symbols);
(2) CRS (at least for one antenna port);
(3) PSS;
(4) SSS: when SSS is transmitted and used for discovery signal, either SSS0 or SSS1 (sequence transmitted in subframe#0 or subframe #5 can be used. However, it is not desirable to use both sequences unless the UE detects the subframe index or SFN of the cell by reading two SSS sequences);

(5) Potentially considering to avoid collision with PBCH; and (6) Guard period.

Figure 14:
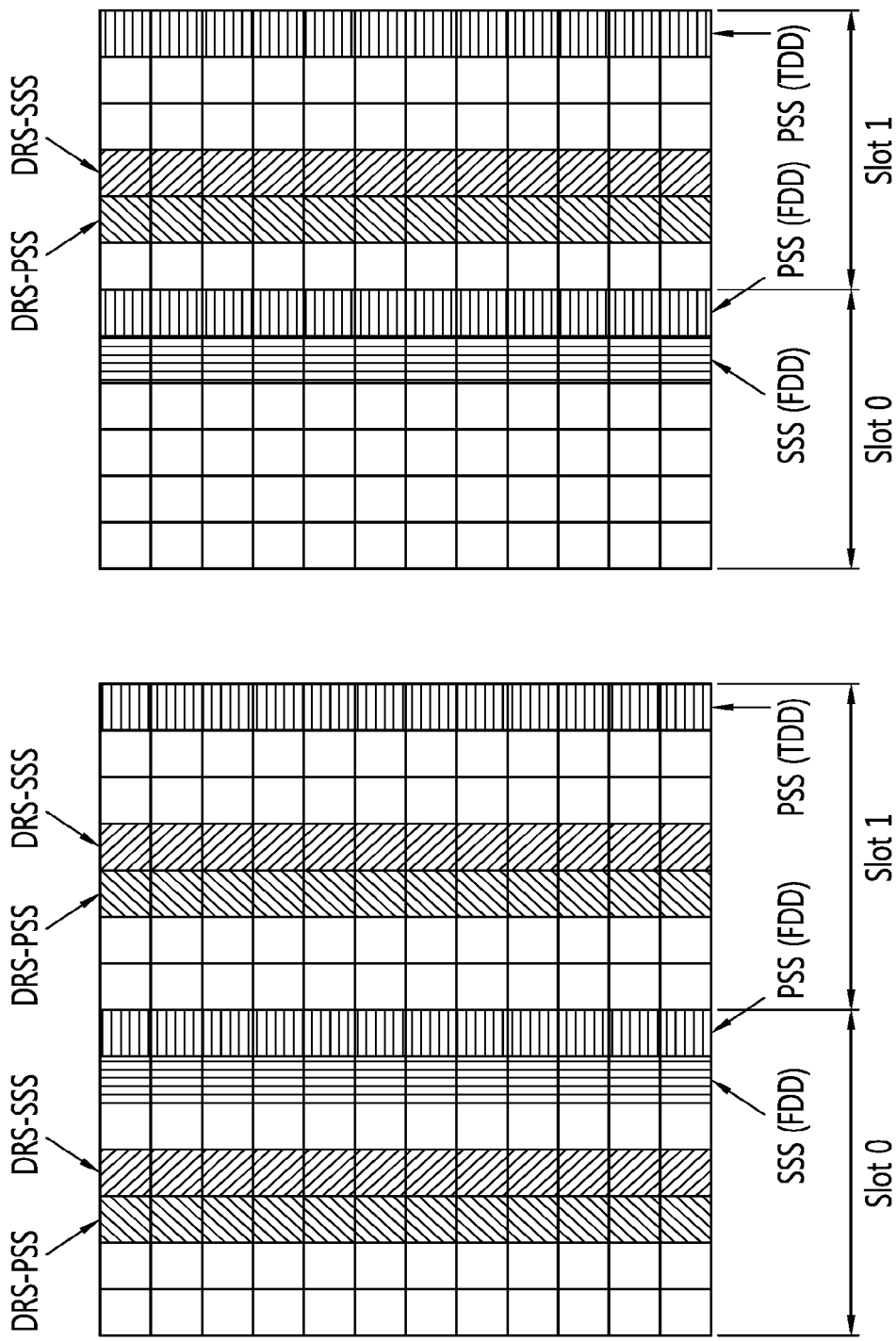
FIG. 14 shows candidate locations of DRS-PSS and DRS-SSS according to one aspect of the present specification.

FIG. 14 shows candidate locations of DRS-PSS and DRS-SSS according to one aspect of the present specification.

In normal subframe, candidate locations would be as follows.

As depicted, in normal CP, OFDM symbol 2/3 of each slot may be used. In extended CP, OFDM symbol 1/2 in second slot can be used. In special subframe, OFDM symbol 2/3 in first slot or 1/2 in first slot in normal/extended CP can be considered. If DRS-CSI-RS is transmitted as well, to avoid collision with PSS/SSS, either DRS-CSI-RS may not be transmitted at PRBs where DRS-CSI-RS collides with PSS/SSS (it may impact discovery signal performance) or to avoid performance impact, it can be further assumed that DRS-CSI-RS will be transmitted in non-center-6 PRB system only if the system bandwidth is larger than 6 PRB. Or, a discovery signal may be transmitted only in subframe where PSS/SSS is not transmitted by the network configuration and thus collision would not be occurred. When DRS collides with PBCH, advanced UE may assume that DRS will be transmitted regardless of PBCH (and thus PBCH will be rate matched or punctured). Since legacy UE is not aware of DRS signal, it may assume that PBCH will be transmitted where the performance of legacy UE would be impacted as the DRS may override REs colliding with PBCH.

Figure 15:
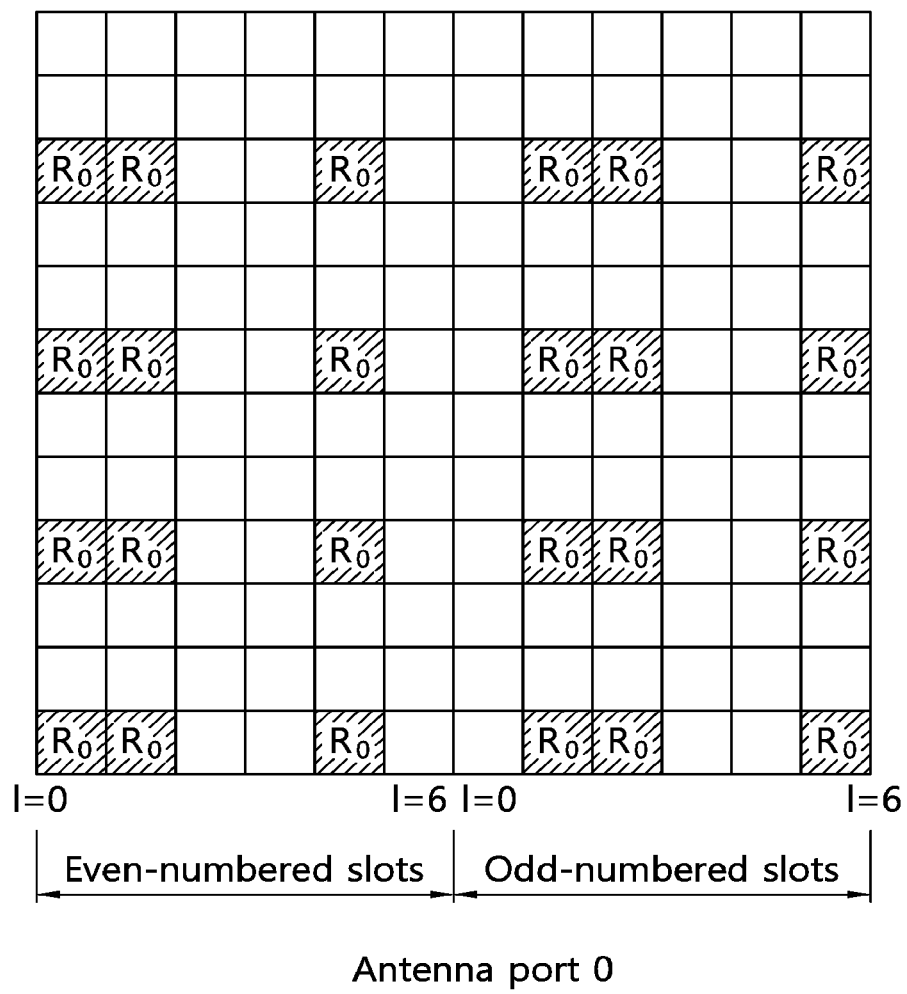
FIG. 15 shows a DRS RS pattern based on CRS according to the present specification.

Furthermore, when transmitting the DRS, the number of antenna ports which may determine the RE density of DRS signal may be determined regardless of actual antenna ports indicated by PBCH antenna ports. To allow dense DRS transmission, it would be desirable to fix 4 antenna ports (only for RE mapping) where actual transmission may be done via single antenna ports or multiple antenna ports. In terms of computing RSRP, a UE may assume that it is transmitted from single antenna such that all REs can be used for measurement. FIG. 15 shows a DRS RS pattern based on CRS according to the present specification.

If CSI-RS is used for DRS, 4 antenna port can be assumed to determine RE position where actual transmission may be done via single port or multiple port if configured by higher layer or known to the UE. In other words, CDM may not be utilized. The sequence may be generated assuming single antenna port where the same sequence is transmitted over the resource location where 4 antenna ports are assumed in the current CSI-RS configuration as in the Rel-11 specification. In other words, an example of mapping can be based on the following formula. If the UE has not acquired any information about antenna port, it may assume single antenna port transmission.

$$a_{k,i} = l_{l,n_s}(m') \text{ where}$$ [Math FIG. 4]

$$k = k' + 12m + \{-0, -6\} \text{ for normal } CP,$$

$$\{-0, -3\} \text{ for extended } CP$$

$$l = l'' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$l'' = 0, 1$$

$$m = 0, 1, \ldots, N_{RB}^{DL\_DRS} - 1$$

$$m' = m + \left\lfloor \frac{N_{RB}^{max,DL} - N_{RB}^{DL\_DRS}}{2} \right\rfloor$$

If PRS is used, the pattern with one or two antenna PBCH ports is used for DRS where the density of PRS is higher than 4 ports.

4. Multiplexing of DRS with Data Transmission

When a discovery signal (i.e., DRS) is transmitted, if the cell is on-state or MBMS transmission occurs, data transmission may be occurred. In terms of MBMS transmission, it is not desirable to transmit MBMS transmission in subframes where discovery signals are transmitted since it may occupy resources in MBMS region. Thus, a UE expecting to receive MBMS may not expect to receive discovery signal in a subframe. For instance, if the UE is configured to receive MBMS services and/or MBMS subframes, the measurement on the DRS may be performed in a corresponding subframe. For data transmission in on-state, for advanced UE, a rate matching pattern needs to be considered. A UE, if configured with one or more zero power (ZP) CSI-RS configuration used for discovery signal, it may assume that data will be rate-matched around those resource elements. In other words, a muting or rate matching pattern can be configured to a UE regardless of actual discovery signal transmission. A UE further assumes that other signals such as PSS/SSS, CSI-RS may be transmitted in those ZP CSI-RS configurations where still the data will be rate matched around those REs. The same rate matching can be applied to computing the number of available REs for ePDCCH resource when EPDCCH is configured in that subframe. In other words, those REs configured by ZP CSI-RS configurations for discovery signal will not be accounted for EPDCCH available REs and the necessary procedures to determine the minimum aggregation level and resource mapping should be taken.

If CP length used for discovery signal and data transmission are different (e.g., extended CP for DRS and normal CP for data transmission), when data transmission occurs, advanced UE shall assume that CP used for DRS is used for data transmission as well in that subframe including both data and ePDCCH transmission (and also for PDCCH transmission).

Furthermore considering a case where DRS is transmitted only via sub-band (not via entire system bandwidth), ZP CSI-RS configuration can also include the list of PRBs or bandwidth where ZP CSI-RS configuration can be applied.

Considering CoMP operation, when dynamic point selection (DPS) is used, considering discovery signal transmission, more than one ZP CSI-RS configuration may be configured per PQI entry where one is to use for data rate matching for CSI-RS configurations (of neighbor cells) and the other is used for data rate matching for DRS configurations. Since the interval may be different between two ZP-CSI-RS configuration, it would be better to configure different ZP-CSI-RS configurations or at least two different interval/offset configurations. This may be applicable only to advanced UEs. Considering potentially hopping of CSI-RS resources of DRS signal, if needed, a hopping pattern or configuration change can be specified in a CSI-RS configuration used for DRS. In other words, ZP-CSI-RS configuration configured for DRS may have subframe-index dependent or SFN-dependent RE mapping or configuration mapping such that actual ZP-CSI-RS RE positions may be changed over time following a predetermined or higher-layer configured pattern. Or, simply a ZP-CSI-RS configuration which consists of multiple NZP-CSI-RS configurations for multiple DRS signals from multiple neighbor cells can be configured to a UE where the actual mapping between REs to DRS-CSI-RS from a specific cell may change over time or over SFN. In other words, a cell ID=1 may transmit CSI-RS in CSI-RS configuration #0 at one time where next time it may transmit CSI-RS configuration #1. Regardless of actual location change, a UE can assume REs configured in the ZP-CSI-RS configuration will be rate matched.

The rate matching can be applied for SPS as well according to the configuration per subframe where SPS-PDSCH is transmitted.

As discussed above, at least two different interval/offset configurations for ZP-CSI-RS configuration can be supported in the present specification. In one example, the maximum number of the different interval/offset configurations may be associated with the duration during which the UE performs measurement on the DRS (as illustrated in FIG. 11). As explained above, the maximum length of the duration can be set to 5 ms, and thus the maximum number of the different interval/offset configurations can be set to 5. Namely, zero or a maximum of five different interval/offset configurations used for ZP-CSI-RS can be used in the present specification. When at least two interval/offset configurations are provided, the interval/offset are separately configured.

5. Misaligned SFN Among Cells

If cells transmitting discovery signals (i.e., DRS) in a small cell cluster are not aligned in terms of SFN, there is a need to select a cell which can be used as a 'reference' to transmit discovery signals in a same subframe. Or, an overlaid macro's SFN is used as a reference. Also, it is possible that the serving cell gives the offset value (between serving cell and target cell ? or cells for discovery) can be configured to the UE along with discovery signal timing information. Particularly, this would be necessary if DRS is transmitted in a fixed subframe/SFN such as every 40 msec with SFN %4=0 transmits DRS, then a UE needs to know SFN and/or subframe index of the target cell (or cells to discover). However, cells transmitting discovery signals may align themselves within a measurement gap period such that a UE can discovery multiple cells at one time attempt. Thus, this SFN and/or subframe offset or actual value can be configured per frequency rather than per cell. This may be applied in a measurement gap (or similar configuration for discovery signal based measurement object) where the offset can be used to indicate the offset value between serving and neighbor cells for the discovery signal based measurement. A UE however may not assume that discovery signals from multiple cells may come in the same subframe.

As discussed above, in a case where a number of small cells transmit DRSs there may occur misalignment between different DRSs, and thus measurement period and offset of the DRS given to the UE may not be sufficient information enabling the UE to determine correct timing for the DRS measurement. Accordingly, UE is required to a select a cell which can be used as a reference to transmit the DRS in a same subframe. As discussed above, the macro cell (e.g., primary cell)'s system frame number (SFN) can be as the reference for the misalignment.

6. Not Aligned CP Among Cells

To protect discovery signals (i.e., DRS), it is desirable to configure separate zero-power CSI-RS configurations covering discovery signals transmitted by cells using different CP. For example, for discovery signal related configuration, the used CP can be indicated or more than one discovery signal related configurations can be configured per each CP length. For example, DRS-PSS/DRS-SSS may be transmitted in different OFDM symbols for normal CP and extended CP. Thus, it is desirable to transmit in different subframe of discovery signals. Or, one simple approach is to use "extended CP" or "normal CP" regardless of actual CP used for data transmission. In this case, actual CP used for data transmission will be configured to a UE (or discovered by UE) upon configuring the cell discovered. If this is used, a UE may not assume that CP used for discovery signal is identical for CP used for data transmission. This would be useful when DRS-PSS/DRS-SSS is transmitted in a SFN manner and the time/frequency synchronization accuracy may not be so high by one-shot of DRS-PSS/DRS-SSS and thus transmitting DRS-CSI-RS or DRS-CRS using extended CP would be beneficial for UE performance. However, this has a drawback where multiplexing of data and discovery signal would become more challenging particularly for legacy UEs. When only one type of CP is used for DRS, to generate DRS signal, Ncp may not be used. In general, subframe index and Ncp which may not be relevant for DRS may not be used for sequence generation. This is particularly important in a case when a UE does not know the SFN or slot index of the target cell for detection or from where DRS is transmitted.

7. TDD Duplex

When TDD is used, depending on TDD DL/UL configurations, the number of downlink subframes is limited. Considering subframe #0/#5 is used mainly for PSS/SSS and PBCH/SIB transmission and discovery signal may be transmitted while the cell is on-state as well, utilizing special subframe should be considered. In this case, for a legacy UE, long guard period may be configured such that a legacy UE may not expect to receive any RS in special subframes where advanced UE can be configured with discovery signal transmission along with different guard period configuration. For this, new CSI-RS configuration in special subframe can be considered as well as new ZP CSI-RS configuration covering those new CSI-RS configurations specified in special subframes. For special subframe configuration, a UE can be configured with special subframe configuration used for discovery signal transmission and potentially used for data transmission (for advanced UEs). Alternatively, a UE may assume that guard period is same as configured in SIB (same as to legacy UEs) whereas discovery signals can be transmitted in those guard period following discovery signal transmission configurations. In this case, ZP CSI-RS configurations for DRS may not be necessary.

Note that a UE can be configured with duplex mode of each frequency layer when network assistance information is available such that a UE may assume a certain pattern of PSS/SSS and/or CSI-RS/CRS per duplex type per each frequency. In other words, blind decoding of different PSS/SSS location to determine duplex mode may not be necessary if advanced discovery procedure is utilized. Furthermore, a UE can be configured with CP length used in each frequency (at least for DRS transmission) such that blind decoding of CP length may not be necessary either with advanced discovery procedure.

When TDD enhanced Interference Mitigation & Traffic Adaptation (eIMTA) is used, it is possible that a subframe where discovery signal has been scheduled is changed to uplink subframe. To avoid this kind of situation, it is considerable to allow only subframe configured as downlink subframe by a system information block (SIB) can transmit discovery signals. Otherwise, a UE may assume that discovery signal will not be present in subframes changed to uplink subframe indicated by dynamic signaling. Or, it is also possible that eNB will transmit DRS regardless of DL or UL subframe according to the configured DRS transmission configuration. This would be useful particularly for neighbor cell measurement.

As discussed above, eIMTA is a scheme where a certain TDD uplink subframe originally allocated for a certain transmission (e.g., uplink) is dynamically allocated for another one (e.g., downlink). Accordingly, if eIMTA is used for a UE configured to perform DRS measurement based on DRS configuration given by the network, it should be clarified that which TDD subframes are assumed to be carrying the DRS. To further improve the conventional art, the present specification proposes to assume that a TDD downlink subframe allocated by the SIB is only subframe(s) carrying the DRS.

With respect to special TDD subframes (e.g., DwPTS and UpPTS), the following improvement are further proposed by the present specification.

For DwPTS region among neighbor cells, unless informed otherwise, UE may assume the shortest DwPTS region. Or, it may assume that the same DwPTS configuration is used among neighbor cells from the serving cell. Or, DwPTS region can be configured per frequency (along with potentially configuration of UL/DL).

In more detail, based on the conventional art, there is a technical problem in which a UE does not know the exact length of special TDD subframes of the neighbor cells when measuring the DRS. Accordingly, the present specification proposes that the UE assumes that a length of DwPTS region as a length of special TDD subframes of the neighbor cells when measuring the DRS.

8. Handling of Short-Term Measurement/Detection Accuracy

Considering a case where a UE may perform cell detection on a cell infrequently (e.g., every 200 msec), it is important that a UE can detect a cell in one attempt not to increase the latency of cell detection or if DRS transmission occurs rather occasionally, it is important to make it feasible to detect a cell in one instance of DRS transmission. To enhance the cell detection and measurement performance, some aspects should be considered. One is that the accuracy of time/frequency tracking by one-shot PSS/SSS transmission in a DRS transmission interval. It is therefore necessary to consider a case where multiple shot of PSS/SSS transmission may be necessary. To transmit multiple PSS/SSS, either multiple transmission over multiple subframes or multiple transmission in a subframe can be considered. The problem with multiple transmission in a subframe is that it becomes challenging to multiplex DRS with existing RS when the cell is on-state. Thus, when it is used, OFDM symbol used for CRS transmission may not be used for DRS signal transmissions. Or, in that case, since a UE can use CRS for the same purpose, DRS colliding with existing signals may be omitted. However, this may impact the performance of neighbor cell detection which may not be aware of the cell state, it is not desirable to change the DRS transmission depending on the cell state. However, if there is a mechanism that UE can discover the cell state, different DRS signal composition can be also considered. When DRS transmission is occurred over multiple subframes, considering potentially different TDD DL/UL configurations and different duplex and collision with subframe #0, the number of repetition may not exceed two subframes. Particularly in TDD, if two subframes are used for DRS transmission, to work with most special subframe configurations, it is desirable to transmit DRS-PSS/DRS-SSS in a first slot rather than in second slot. It means that the first DRS-PSS/DRS-SSS may be placed in different OFDM symbol from second DRS-PSS/DRS-SSS. Or, only DRS-PSS or DRS-SSS repetition can be further considered.

In terms of measurement, it would be still desirable to take multiple measurements over the time to reflect channel condition changes (e.g., fading, Doppler, etc.), thus, if repetition occurs, it would be desirable to reduce the DRS signals used for measurement (such as DRS-CSI-Rs) transmission interval. For example, if DRS-PSS/DRS-SSS is transmitted in every 200 msec, DRS-CSI-RS may be transmitted in every 40 msec where 5 samples of DRS-CSI-RS can be accumulated for the measurement. It is however considerable to repeat measurement RS over multiple subframes in a DRS interval as well.

Considering a case where muting may be performed for PRB locations where DRS is transmitted, in other words, PRBs in a subframe may only carry DRS from potentially multiple cells, data may not be scheduled in those PRBs in spite of cell is on-state, DRS signals may use all the REs. One example is to use PRS configuration format or repeated CRS or repeated CSI-RS configurations. Furthermore, repeating PSS/SSS can be also considered. When this is considered, still, the OFDM symbols used for PDCCH may not be used for DRS as PDCCH needs to be spanned over the entire system bandwidth. Also, if EPDCCH set is configured to a subset of full PRBs used for DRS, handling of EPDCCH would be necessary by not scheduling EPDCCH or by eNB scheduling. In other words, if this is assumed that a UE may assume that DRS will be transmitted regardless of data transmission or cell state or EPDCCH configuration. Either the maximum OFDM symbols used for PDCCH is assumed when DRS is designed (e.g., 3 for system bandwidth is larger than 1.4 Mhz, 4 for 1.4 Mhz) or a UE may assume that PDCCH will not be overlapped with DRS if configured where DRS may use all OFDM symbols except for one or two OFDM symbols reserved for PDCCH transmission.

9. Cell Detection Algorithms Using Multiple Signals for DRS

When multiple signals are used for discovery signals, there are multiple approaches of utilizing those signals for cell ID detection, measurement, and so on. This section describes a few alternative approaches and potential benefits and drawbacks of each approach. For a convenience, let's assume that discovery signal can consist of PSS, SSS and CSI-RS or PSS, SSS and CRS. Whether one DRS transmission includes only one PSS, SSS and CSI-RS or PSS, SSS and CRS or multiple can be used is not fixed. For a convenience, this specification explains one example using one transmission of each signal. However, it can be applied to multiple transmission of each signal without the loss of generality.

First Category

Cell Detection Utilizes all Three Signals:

(1) A cell ID consists of [n_cid_1]*xy+[n_cid_2]*y+[n_cid_3] where for example y is 17 and x is 10. PSS can carry n_cid_1 and SSS can carry n_cid_2 and CSI-RS or CRS can carry n_cid_3 when sequence is generated for each signal. More specifically, n_cid_2 can be used to indicate the location of CSI-RS configuration/resource or CRS v-shift/resource. In other words, n_cid_2 (second cell ID indicator) can be used to indicate the location of CSI-RS or CRS resource. As an example, cell ID=308 can be represented as n_cid_1, n_cid_2=6, n_cid_3=17 where if CSI-RS is used and the total configurations used for CSI-RS are 10 sets, configuration 6 can be used for carrying the DRS for the cell. The location can be mapped or inferred from n_cid_1 and/or n_cid_2. The exact function may be different. The principle of this approach is to divide cell IDs in to multiple signals to reduce the number candidates per signal and if CRS or CSI-RS which may have multiple candidate resource locations, the partial or full cell ID can be used to infer the resource location of those signals.

(2) A cell ID is same as Rel-8 PSS/SSS where CRS or CSI-RS may carry the full cell ID: in this case, cell ID may not be divided further and the same sequence for PSS and/or SSS can be reused. However, cell ID detection can be done using multiple signals. For example, instead of relying on PSS/SSS for cell detection, all signals are used for detecting a cell ID. In this case, detection of PSS can be same as Rel-8 implementation whereas detection of cell ID using SSS may be slightly changed to utilize SSS and/or CSI-RS (or CRS). In generating sequence, SSS and CSI-RS may be used jointly such that the same scrambling can be used in different resource locations. In terms of detecting correlation, correlation of PSS and either from SSS or CSI-RS/CRS can be used for cell detection.

Second Category

Cell Detection Utilizes Only One Signal Such as CSI-RS and/or CRS (1) If this is used, frequency tracking or time tracking can be accomplished via PSS and/or SSS. In terms of cell ID, a common cell ID may be used. When network synchronization is not achieved among small cells, and thus, transmission timing difference among small cells may exceed 3 us, it may not be effective to use the same cell ID for PSS/SSS. In that case, the same cell ID may be shared only among cells synchronized. Thus, multiple cell IDs can be detected by detecting PSS and/or SSS where each cell ID represents different timing or grouping. The ID detected PSS/SSS may not be tied with cell ID detected by CSI-RS or CRS. In other words, sequence or scrambling used in time/frequency tracking may not be used for cell ID detection. Alternatively, ID detected by PSS/SSS can be used for scrambling CSI-RS or CRS as shown in above approaches.

(2) To minimize the complexity increase, a UE may assume the whole or partial network assistance such as duplex type or CP length, etc.

In this category is used, the combination of discovery signal can be as follows:

(1) PSS+CSI-RS assuming PSS is sufficient for time/frequency tracking for CSI-RS cell detection. If the performance of time/frequency tracking with PSS is not sufficient, frequency tracking using CSI-RS can be further considered. In this case, predetermine location of CSI-RS resource would be important to guarantee the performance;

(2) PSS+PSS+CSI-RS where two PSS signals are used for time/frequency tracking and CSI-RS is used for cell ID detection and measurement;

(3) PSS+CRS;

(4) PSS+PSS+CRS; and (5) PSS+SSS+CRS (+CSI-RS) in this case, a UE may assume that CSI-RS is present only if configured with CSI-RS configuration such as scrambling ID, the resource configurations for CSI-RS, etc.

When multiple PSS is transmitted, instead of transmitting multiple signals in a same subframe, two or multiple subframes can be utilized.

Third Category

Cell Detection Utilizes Only PSS/SSS:

(1) if this is used, cell detection can be performed as in Rel-8 cell detection without assuming potentially aggregation of multiple PSS/SSS over time (it can be aggregated depending on the latency of cell detection requirement, yet, it is desirable to be able to detect cell ID by one-shot PSS/SSS or one-burst of DRS); and (2) When this is used, measurement may be performed using PSS/SSS as well or additional RS such as CRS or CSI-RS can be used for measurement.

10. Potential Network Assistance Information and Signaling

In general, discovery signal transmission location can be either fixed in a specification or configurable by higher layer. As it is designed to allow higher multiplexing/orthogonality, it is desirable to be able to configure the periodicity and/or offset of discovery signal transmission. Furthermore, considering a case where overlaid macro may not be aligned in terms of SFN, some flexibility to configure the periodicity and offset can be beneficial. However, it is still feasible to prefix the location of discovery signal transmission.

Regardless of whether the discovery signal transmission periodicity and offset are prefixed or configurable, some network assistance information to help the network discovery would be necessary. At least, some timing where a UE can find discovery signals would be necessary and the timing and duration of those timing can be determined based on the detection performance requirement.

One example is to use the current measurement gap configuration as it is where a UE needs to assume that discovery signal may not be transmitted in other than configured measurement gap. Thus, autonomous cell detection using discovery signal can be more challenging. In this case, by proper network coordination, by configuring measurement gap per UE, the periodicity and offset of discovery signal can be given. However, it is feasible that each frequency uses different offset, thus, a separate measurement gap or periodicity/offset can be configured per frequency. Moreover, a list of cell IDs per frequency and a list of candidate locations where discovery signals are transmitted can be also signaled to help the network discovery at a UE. A list of candidate locations can be predetermined and thus the configuration may not be necessary.

Alternatively, to consider multiple frequencies and different offset per frequency, a measurement gap can be configured such as:

Measurement interval: maximum discovery signal transmission interval such as 200 msec Measurement offset values Set of {frequency, offset}

Where a UE can perform measurement on a certain frequency at a given offset value. Not to incur too much overhead and interruption, the offset value would be desirability multiple of current measurement gap such as 40/80 mesc+delta_offset. In other words, a UE can perform measurement on a set of frequencies near every 40 msec or 80 msec and the discovery signal transmission interval can be larger than typical measurement gap. Or, different offset can be used per a set of cells. Thus, in that case, Measurement interval: maximum discovery signal transmission interval such as 200 msec
　　Measurement offset values
　　Set of {frequency, cell IDs, offset}

Furthermore, the location of DRS RSs can be also assisted. One example is to give a configuration information about the location of either 'SSS' or 'PSS' or additional 'SSS' or additional 'PSS' in terms of OFDM symbol or frequency. Furthermore, a gap used between PSS and SSS according to each NCID(2) ? used for PSS scrambling e.g., can be configured for all NCID values (or a mapping table or an index to indicate mapping table). Or, if CSI-RS type DRS is used, CSI-RS configuration or mapping between CSI-RS resource position and cell ID can be configured. One example is that the total number of CSI-RS configurations (e.g., 10 or 20) where the starting offset can be given where each cell locates its DRS in cell ID % max_configuration_number+offset among feasible configurations or resource positions. For example, if 10 CSI-RS configurations are used with offset=0, cell ID % 10=0 will use CSI-RS configuration #0, cell ID % 10=1 will use CSI-RS configuration #0 and so on.

Also, mapping between cell ID and Vshift value can be configured where for example if CRS with Vshift is used for discovery signal, rather than following current specification, different Vshift according to the mapping can be determined if higher layer signaling is given.

Moreover, considering a case where network timing information is not known among eNBs or cells, maximum uncertainty in terms of timing can be also configured such that a UE may take maximum uncertainty in terms of measurement gap application. Along with maximum uncertainty, a UE may be configured with large measurement gap to find discovery signals for the target cells. The large measurement gap may be used once or only a few times. Once a UE discovers the discovery signal transmission timing information, a UE may report the discovered "offset" value to the serving cell so that smaller measurement gap can be configured. For example, if serving cell and target cells are "30 msec" off and the serving cell does not know the timing information, it may configure the maximum measurement gap of 40+6=46 msec assuming discovery signal is transmitted in every 40 msec. Once a UE discovers that 30 msec offset between serving cell and target cells discovery signal transmission, it may inform the serving cell. Or, the UE reports the subframe or SFN information of the serving cell when discovery signal is detected. Or, eNB may configure multiple measurement gap patterns where offset value may change per measurement interval. For example, a measurement gap pattern can be given {measurement gap pattern=160 msec with 10 msec gap
　　global_offset=0
　　In every 40 msec,
　　offset value 1=10
　　offset value 2=20
　　offset value 3=30
　　offset value 4=40
　　} where measurement interval would be 160 msec and each measurement can be occurred in every 40 msec with different offset values. In first 40 msec interval, the offset value 10 is used, thus a UE starts measurement at 40 msec+10 msec (assuming starting at 0 msec), the second offset value 20 is used for second 40 msec, thus a UE starts measurement at 80 msec+20 msec (100 msec), and so on. Assuming maximum uncertainly is 40 msec, this is to divide search window per each measurement episode until a UE finds the offset value. When a UE discovers the offset value, a new measurement gap is configured or a UE may ignore sub-offset values.

Since it is also feasible that some cells in a frequency may transmit discovery signals whereas other cells may not transmit discovery signals, it is desirable to know which cells are transmitting discovery signals and thus a UE can use discovery signals for measurement and cell detection. One simple approach is to send a list of cell IDs which can be discovered/measured by discovery signals. If the list of cell IDs is not known or configured, a UE may assume that all the cells in the frequency transmit DRS if DRS is configured for that frequency. In a case, a measurement gap is used for inter-frequency covering both legacy and DRS based cell detection and measurement, a UE may perform both detection/measurement at each measurement gap. In that case, if a UE detects a cell with the same ID with both legacy and DRS measurement, it shall assume two cells are different even though the cell ID is the same and reports both values (along with potentially detection/measurement RS type). Alternatively, a UE may assume that the cell ID is the same and takes only DRS-based detection/measurement. If a UE is configured with a list of cell IDs transmitting DRS, whether to detect other cells with legacy signals would be up to UE implementation. Given that measurement gap configuration, a UE is free to perform both detection algorithms and reports them. However, if a DRS is configured for a given frequency, a UE may not perform "legacy signal based detection/measurement" other than configured subframes for measurement/detection (e.g., measurement gap). This is to avoid a case where a UE may detect legacy signals transmitted by ON-state of the cell which transmits DRS and perform measurements on the cell. If a UE performs measurement, it may report the RS type along with results.

As discussed above, the present specification proposes that if the cell is an unknown cell and configured with DRS configuration for a certain frequency, a UE may assume that all the cells in the frequency transmit DRS. Accordingly, a UE may assume that a known cell, such as P-cell of the UE, does not transmit the DRS. Further, as discussed above, DRS can be only configured for a certain number of frequencies, the UE only performs the DRS measurement for the configured frequencies and does not perform legacy signal based measurement. Further, the UE may perform legacy signal based measurement for un-configured frequencies.

When a UE is configured with event-triggered reports, it is notable that a UE may be configured with different thresholds for legacy based measurement vs. DRS-based measurement since RSSI measurement can be different. The threshold values are up to the network, or a single offset/delta value may be given to the UE which will be used according to the measurement RS type or RSSI measurement mechanism. In terms of computing RSSI, it is further considerable to use either OFDM symbols or subframe which are not carrying discovery RS. One example is to utilize RSSI on CRS-OFDM symbols (#0/#4 in each slot in normal CP regardless of target cell state) if DRS consists of PSS/(SSS)/CSI-RS. Another example is to use non-DRS-subframe entire OFDM symbols for RSSI measurement in a measurement gap. When RSSI is extremely low due to no data transmission, RSRQ computation for the DRS can be done as RSRP×N/{RSRP×N+RSSI} or similar fashion not to create infinite value for RSRQ.

Based on the present specification, a single or multiple measurement gaps can be configured for UEs. The following embodiments are mainly related to a situation where multiple measurement gaps are configured.

Handling Multiple Measurement Gaps

As discussed above, a UE can be configured with one measurement gap configuration for DRS-based measurement.

In case a UE is configured with a measurement gap due to hardware restriction or eNB configuration for DRS based measurement, measurement gap may follow legacy pattern or a new pattern or a relaxed pattern (such as 40 msec periodicity with delta offset value where a UE may be able to perform the measurement m times of measurement gap every 200 msec).

Figure 16:
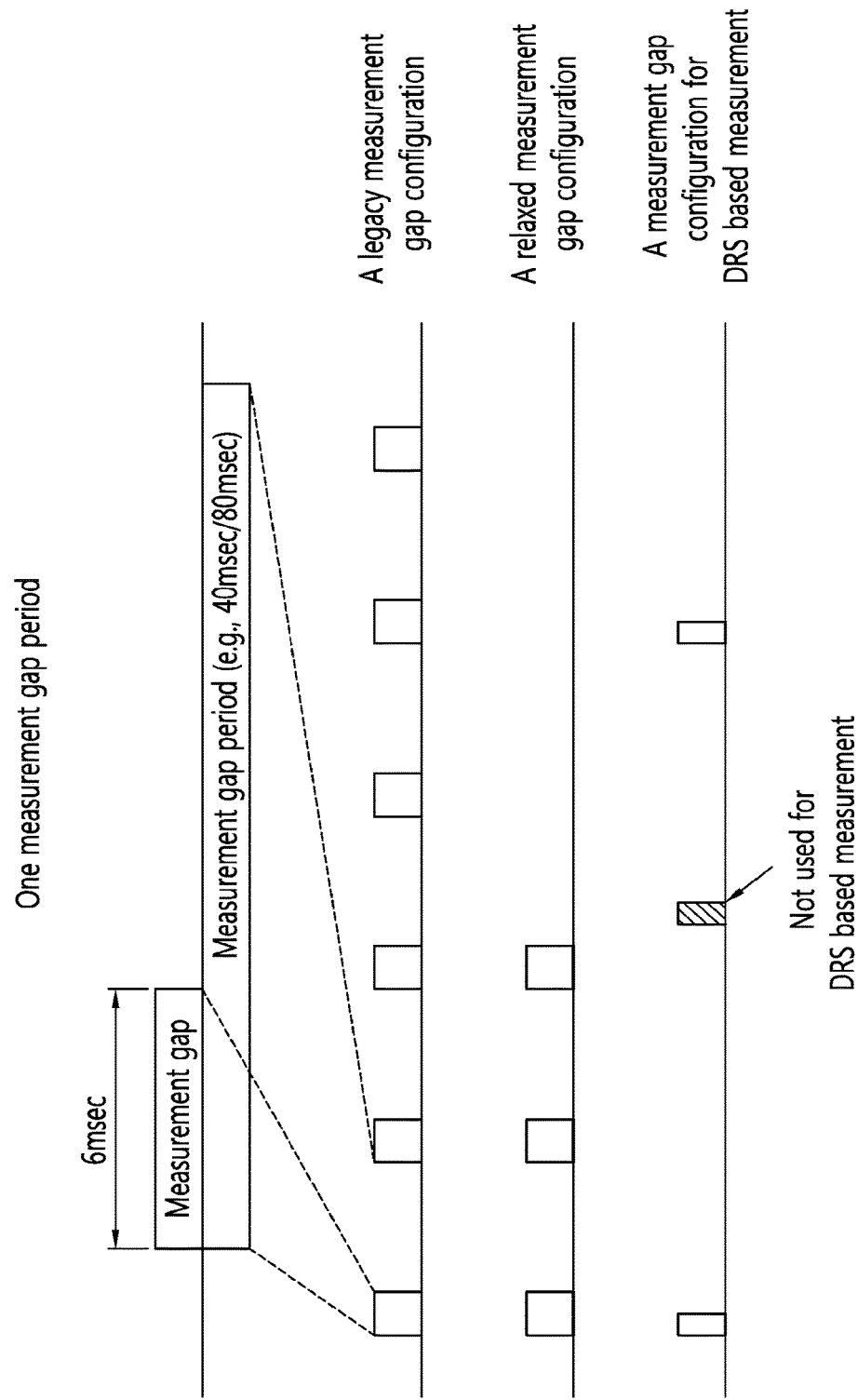
FIG. 16 shows a number of measurement gap configurations proposed by the present specification.

FIG. 16 shows a number of measurement gap configurations proposed by the present specification.

As depicted in FIG. 16, in case measurement gap is per legacy pattern, the UE can be configured with only one measurement gap.

Further, in case measurement gap is per the relaxed pattern, the UE can be configured with up to two measurement gaps where one with a legacy and the other one with the relaxed pattern. In this case, a UE can assume that the relaxed pattern is overlapped with the legacy pattern such that the relaxed pattern is a subset of the legacy pattern. Or, a UE can ignore "non-overlap" measurement gap (i.e., configured for the measurement gap for DRS-based measurement, but not configured for the measurement gap for legacy signal based measurement (or the legacy gap pattern), UE can ignore those gaps for the measurement. Or, a UE is mandated to skip measurement in those measurement gaps not aligned between two.

In case measurement gap is per a new pattern, the UE can be configured with up to three measurement gaps where a UE should assume that all three measurement gaps are somewhat aligned. The three measurement gap can include a measurement gap for DRS-based measurement, another gap for relaxed requirement (per relaxed measurement gap pattern) and the last gap for the legacy measurement gap. First, a UE may assume that the relaxed gap pattern is a subset of the legacy measurement gap pattern. Then, a UE may further assume that the measurement gap for DRS-based measurement is a subset of either the relaxed measurement gap or the legacy measurement gap (or both of them). Similar to the above case, a UE may ignore "non-overlapped" gaps between the measurement gap for DRS-based measurement with either relaxed or legacy measurement gap configuration or a UE should not perform measurement in those "non-overlapped" gaps. At the same time, a UE may be able to request to perform the measurement on those gaps even though are not aligned with other measurement gaps. Example is shown in below.

Another possible way of configuring measurement gap for DRS is to configure as "a multiple" of a legacy measurement gap such as measurement gap following a legacy gap pattern every m-th gaps are used for DRS based measurement.

Also, a gap for DRS based measurement can have shorter measurement gap as shown in FIG. 16.

Alternatively, when multiple measurement gap is configured, the total duration of measurement gap may be covered by Gap pattern 0 (40 msec with 6 msec gap).

For example, a legacy measurement gap of gap pattern 1 can be configured for legacy signal based measurement and a new measurement gap of gap pattern 1 can be configured for DRS based measurement. Since the total service interruption time of both measurement gaps would not exceed gap pattern 0, a UE can perform the measurement. If two measurement gaps are colliding, a UE can give high priority on DRS based measurement if both cannot be attempted at the same time.

Figure 17:
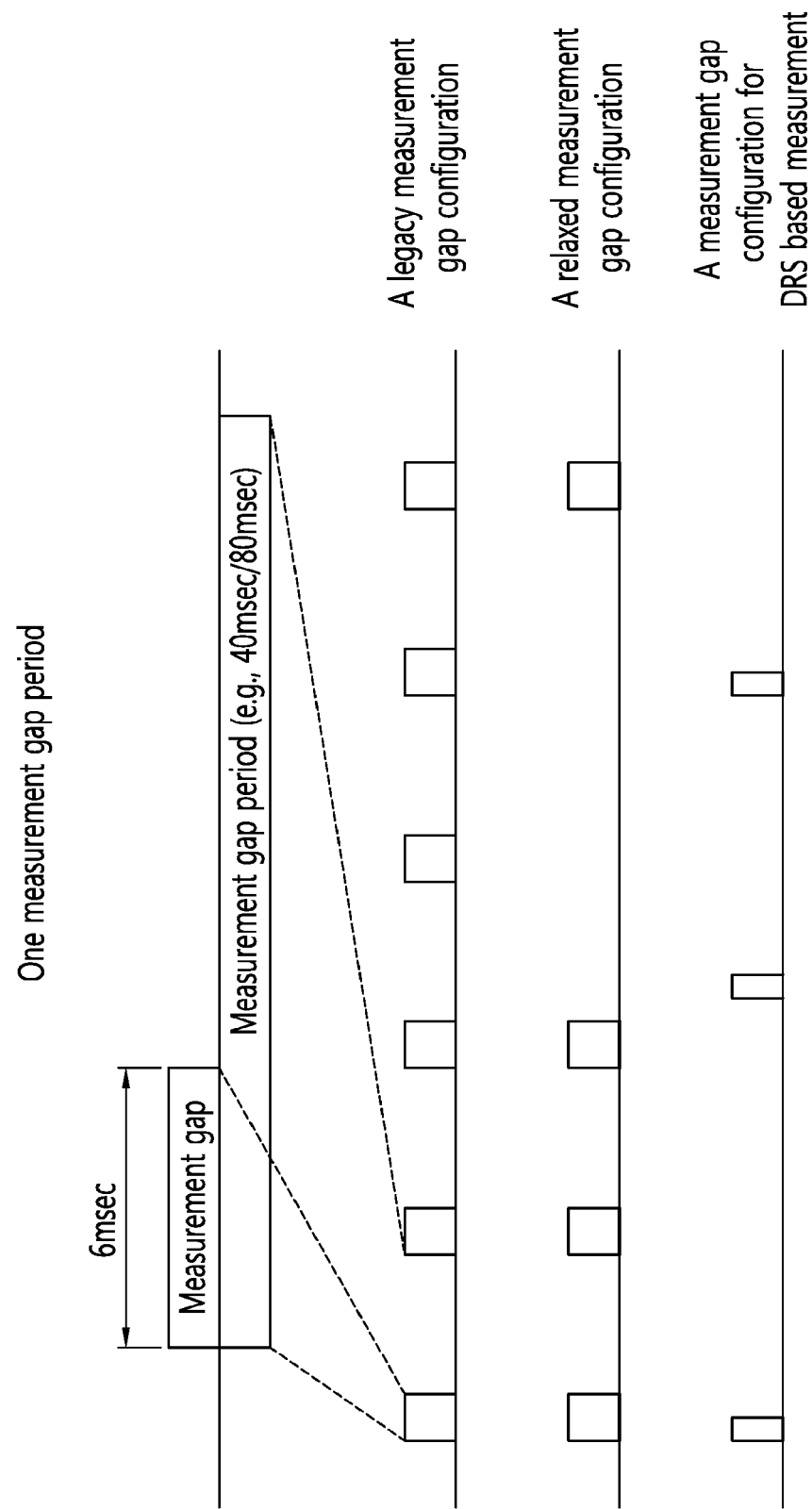
FIG. 17 shows an additional embodiments related to measurement gap configurations proposed by the present specification.

FIG. 17 shows an additional embodiments related to measurement gap configurations proposed by the present specification.

Note there can be other possible options satisfying Proposal 7 (a UE should not have more service interruption time than currently configurable measurement gap) without having the any constraint that the configured measurement gap pattern for DRS-based measurement should be a subset of the configured legacy measurement gap pattern when two measurement gap patterns are configured. While allowing independent measurement gap pattern configurations for DRS-based and legacy-based measurement, there can be one restriction that both of the two configured measurement gap patterns (i.e., one for DRS-based and the other for legacy-based measurement) should be covered by one legacy measurement gap pattern in Table 8.1.2.1-1 in 3GPP TS 36.133. With this one restriction, the measurement gap pattern for DRS-based measurement can be newly defined, e.g., with shorter MGL and/or longer MGRP.

Another approach to consider is to restrict the use of Gap Pattern 0 when a UE is configured with more than one measurement gap. For example, if a UE is configured with a measurement gap for DRS and another measurement gap for legacy signal based measurement, neither measurement gap pattern should be based on Gap Pattern 0. By this restriction, the total service time of two or measurement gaps may not exceed the measurement gap of Gap Pattern 0 (i.e., 6 msec per 40 msec). Along with this, a measurement gap pattern for DRS should have longer periodicity than Gap Pattern 0 or 1 (i.e., 40 msec or 80 msec) and/or shorter gap duration (i.e., 6 msec). Even with this, a gap pattern for the relaxed measurement should be a subset of legacy gap pattern. For this, a UE shall not expect to be configured with Gap Pattern 0, if the UE is configured with a measurement gap pattern for DRS based measurement and a measurement gap pattern for legacy based measurement. Or, a UE shall not expect to be configured with Gap Pattern 0, if the UE is configured with a measurement gap for discovery signal based measurement.

Hereinafter, more detailed examples related to the above-explained features are described.

A UE can be configured with a muting pattern per cell or TP. In this case, muting is assumed in a RE-level.

For intra-frequency, if the serving cell in the same frequency is activated, the UE shall not assume that CSI-RS based measurement reporting is triggered.

As discussed in FIG. 11, a set of DRS configuration can be provided via a higher layer signalling to UE in order for signalling a period, offset, and duration for DRS measurement. Examples of the DRS configuration can be defined as shown below. In detail, the followings are for NZP-CSI-RS configurations. For CSI-RS as DRS, we propose the following configurations in below:

TABLE 4

```
CSI-RS-ConfigNZP-r11 ::=           SEQUENCE {
    csi-RS-ConfigNZPId-r11             CSI-RS-ConfigNZPId-r11,
    antennaPortsCount-r11              ENUMERATED {an1, an2, an4, an8},
    resourceConfig-r11                 INTEGER (0..31),
    subframeConfig-r11                 INTEGER (0..154),
    scramblingIdentity-r11             INTEGER (0..503),
    qcl-CRS-Info-r11                   SEQUENCE {
        qcl-ScramblingIdentity-r11         INTEGER (0..503),
        crs-PortsCount-r11                 ENUMERATED {n1, n2, n4, spare1},
        mbsfn-SubframeConfigList-r11       CHOICE {
            release                            NULL,
            setup                              SEQUENCE}
                subframeConfigList                 MBSFN-SubframeConfigList
            }
        }                                      OPTIONAL        -- Need ON
    }                                      OPTIONAL,       -- Need OR
    ...
}
```

TABLE 5

```
MeasObjectEUTRA-R12 ::=                    SEQUENCE {
    carrierFreq                                ARFCN-ValueEUTRA,
    allowedMeasBandwidth                       AllowedMeasBandwidth,
    presenceAntennaPort1                       PresenceAntennaPort1,
    neighCellConfig                            NeighCellConfig,
    offsetFreq                                 Q-OffsetRange        DEFAULT dB0,
    -- Cell list
    cellsToRemoveList                          CellIndexList
        OPTIONAL,                                  -- Need ON
    cellsToAddModList                          CellsToAddModList
        OPTIONAL,                                  -- Need ON
    -- Black list
    blackCellsToRemoveList                     CellIndexList
        OPTIONAL,                                  -- Need ON
    blackCellsToAddModList                     BlackCellsToAddModList
        OPTIONAL,                                  -- Need ON
    cellForWhichToReportCGI                    PhysCellId
            OPTIONAL,                              -- Need ON
    ...,
    Dmtc_config
    DMTCConfiguration                          mandatory {40, 0 default}
    measSFPattern
    MeasSFPatternNeigh                             OPTIONAL
    triggerCSI-RS RSRP                             Boolean {true to trigger CSI-RS RSRP, false not to trigger}
    triggerCSI-RS RSRQ                             Boolean {true to trigger CSI-RS RSRP, false not to trigger}
    DRS-CSI-RSConfigList                       DRS-CSI-RSConfigFormatList
                                                   OPTION (can present only if trigger CSI-RS RSRP or RSRQ is enabled)
    [[measCycleSCell-r10                           MeasCycleSCell-r10
        OPTIONAL,                                  -- Need ON
        measSubframePatternConfigNeigh-r10
        MeasSubframePatternConfigNeigh-r10         OPTIONAL
                                                   -- Need ON
    ]],
    [[widebandRSRQ-Meas-r11                        BOOLEAN    OPTIONAL
        -- Cond WB-RSRQ
    ]]
}
```

TABLE 6

| MeasPatternNeighb |
| --- |
| { |
|     Sequence of 5 bits bitmap |
| } |

TABLE 7

| DMTC config | | |
| --- | --- | --- |
| { | | |
|   Int | periodity | |
|   Int | offset | |
|   Int | duration | Option, if not present assume as 5msec |
| } | | |

TABLE 8

| DRS-CSI-RSConfigFormatList |
| --- |
| { a set of |
|     {cell ID; |
|     A set of DRS__CSI-RS-ConfigNZP-r12; |
|     } |
| } |

TABLE 9

| DRS__CSI-RS-ConfigNZP-r12 ::= | SEQUENCE { |
| --- | --- |
|   antennaPortsCount-r11 | ENUMERATED {an1, an2, an4, an 8}, |
|   resourceConfig-r11 | INTEGER (0..31), |
|   subframeConfig-r11 | INTEGER (0..154), |
|   scramblingIdentity-r11 | INTEGER (0..503), |
| } | |

As shown in Table 7, each set of DRS configurations may include a number of configuration elements, such as "periodicity" indicating a measurement period of the DRS, "offset" indicating an offset of the measurement period, and "duration" indicating a time period during which the UE measures the DRS in one period of the measurement period. Further, as shown in Table 5, each set of DRS configurations are defined based on a frequency (e.g., "carrierFreq").

When a UE is configured with CSI-RS-RSRP or RSRQ triggered without explicit signaling of CSI-RS configurations, the UE shall assume that:

During a measurement duration or by MeasPatternNeighb, let's assume "m" valid downlink subframe indexed 0 to m−1 starting from the first DMTC subframe; and For each subframe, except for the subframe where SSS is transmitted (and/or PSS is transmitted), it can assume 20 CSI-RS configurations or a prefixed set of CSI-RS configurations are used and the scrambling identify of each CSI-RS can be determined by function of F (subframe index=relative offset from DMTC starting among m, CSI-RS RE configuration index).

More specifically, in DRS-CSI-RSConfigFormatList, it can be configured as shown below.

TABLE 10

| { a set of |
| --- |
|     {cell ID; |
|     Boolean implicit {true if DRS__CSI-RS-ConfigNZP-r1 is not present, 0 otherwise} |
|     A set of DRS__CSI-RS-ConfigNZP-r12; OPTIONAL only if implicit is false. |
| } |

In this case, further indication of subframes where CSI-RS is transmitted and some function mapping can be higher layer configured per cell ID as well.

CSI-RS configuration applicability when the network is not synchronized.

At least for FDD, to enhance the multiplexing/ICIC capability, subframe-shift among clusters can be considered. In this case, when NZP-CSI-RS like configuration is given, the question arises how to apply subframe offset. This specification proposes to apply the subframe offset as the following:

TABLE 11

| For subframe index of QCL-ed SSS (same scramling ID with QCL-ed CRS) m during a DMTC, |
| --- |
|   If the subframe offset is k, |
|     k = k % DMTC__Period; |
|     k = (m + k) % 5; |

For example, subframe offset is 39, and SSS is transmitted in second subframe of DMTC, CSI-RS is transmitted in 1st subframe of DRS measurement timing configuration (DMTC) window.

Relationship Between DMTC and Measurement Gap.

Figure 18:
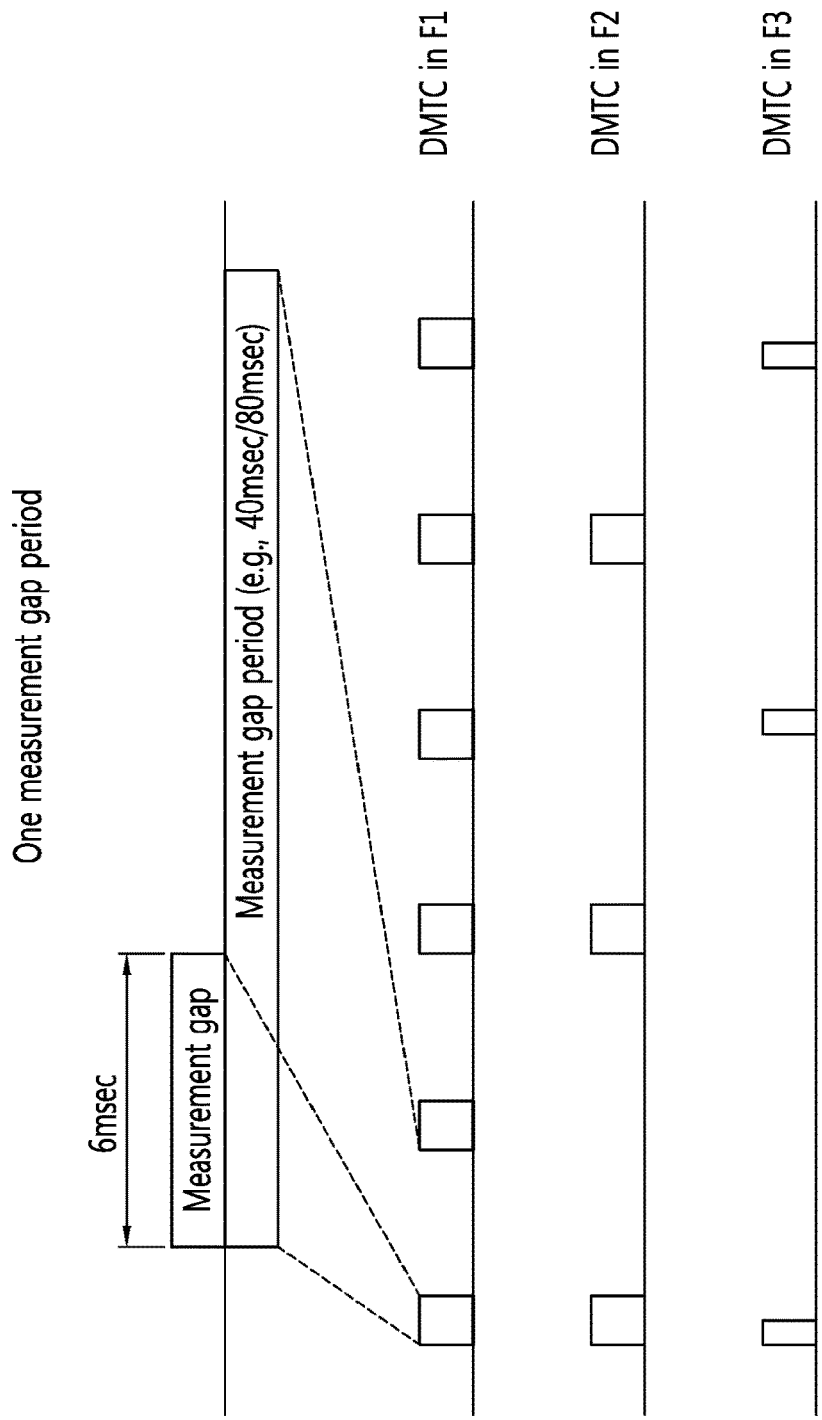
FIG. 18 shows the relationship between UE measurement on DRS and measurement gap.

FIG. 18 shows the relationship between UE measurement on DRS and measurement gap.

When a DRS measurement timing configuration (DMTC) is configured per frequency, for a UE operating cell discovery based on a measurement gap, it is necessary to further restrict the DMTC configurations such that a UE can perform inter-frequency measurements within a measurement gap. Mainly, all or a subset of DMTC occurrence per each frequency should be aligned with a subset of measurement gap pattern. FIG. 18 illustrates this relationship.

When a UE is configured with multiple DMTC which may not be aligned, in terms of UE requirement for discovering a cell, the requirement should be defined that m*max_interval where max interval is the maximum interval value for a cell where a UE can perform measurement. For example, DMTC at a frequency is per 80 msec and measurement gap is per 40 msec with the same offset, the interval of measurement is 80 msec. On the other hand, if DMTC is not aligned with measurement gap, and DMTC is overlapped with measurement gap in every 3 measurement gaps, then, the interval of measurement for that cell is 3*measurement gap interval. Among all frequencies that UE needs to monitor, the interval is determined and the requirement is specified by taking the maximum interval among frequencies.

To avoid this, it is necessary to align DMTC duration and measurement gap. Or, DMTC can be a multiple of measurement gap in that case the requirement needs to be determined by DMTC interval rather than measurement gap interval. Even in this case, it is desirable to have the same DMTC periodicity for all frequencies not to create complicated issue in measurement requirement. Also, it is desirable to configure offset for DMTC and measurement gap such that in a measurement gap, DMTC can be aligned (if present). Thus, the maximum offset of a DMTC in terms of offset within a measurement gap should be less than 4 msec allowing at least one subframe for the measurement. Given that TDD can be also configured, the overlap should be able to include subframe #0 and/or subframe #1 (or #5/#6).

Application of DRS-CSI-RS Measurement and UE Capability

It can be assumed that DRS-CSI-RS is used only for TP identification which may be extended to other cases as well. In other words, DRS-CRS based measurement is sufficient for cell identification and measurement. In that case, from a UE capability perspective, reporting capability or CSI-RS based measurement can be a separate UE capability from DRS-based measurement capability. In other words, a UE can report two different capabilities ? one for DRS-CRS based measurement capability and the other for DRS-CSI-RS based measurement capabilities. Alternatively, a UE capability can be also associated with CoMP capability. For example, when a UE supports Transmission Mode 10 (or enhanced TMs to support CoMP like operation) and a UE supports DRS-based measurements, it implies that a UE can support DRS-CSI-RS based measurements. In that sense, if a UE does not support Transmission Mode 10 (TM10), it is not very useful to configure DRS-CSI-RS based measurements. Thus, a UE can assume that DRS-CSI-RS based measurement can be configured only if it supports TM10. Otherwise, the configuration may be ignored by the UE. More specifically, the capability of TM10 is signaled per band and/or band-combination. Thus, for a frequency configured by DMTC, a UE may assume that DRS-CSI-RS can be configured only if the UE supports TM10 (or enhanced TMs to support CoMP like operation or shared cell ID operation) in that frequency or frequency band where the frequency belongs. Since, CSI-RS based RSRP requires certain UE processing burden, it is desirable to minimize the number of frequencies that DRS-CSI-RS based measurements can be configured. This specification proposes that a UE can be configured with maximum "m" frequencies where DRS-CSI-RS based measurement can be performed. For example, m can be fixed as 1 or can be also signaled by a UE capability. For example, a UE can report the maximum number of frequencies where a UE can perform DRS-CSI-RS based RSRP such that the network can configure the frequencies of DRS measurement based on CSI-RS accordingly. When a UE does not signal the capability, the network may assume that a frequency band where TM10 is supported can also be also configured for DRS-CSI-RS based measurements. Furthermore, a number of TPs/cells searched by DRS-CSI-RS in a frequency can be also configured to a UE in a DMTC configuration. For example, a UE can be configured with the number of desired searching TPs/cells in a frequency, that may limit a UE's processing burden as the UE does not have to search all TPs/cells in that frequency. The number of reported TPs/cells based on DRS-CSI-RS can be also specified in a specification as a requirement of a UE.

In the meantime, in addition to the foregoing examples related to DRS measurement interval, if a UE is configured with CSI-RS, it is expected that the DMTC interval is either 40 msec or 80 msec. It is considered that 160 msec interval is not configured with CSI-RS. Alternatively, 160 msec ZP-CSI-RS configuration can be added. When a UE is configured with 160 msec DRS with CSI-RS, a UE may assume ZP-CSI-RS configurations configured for data rate matching for DRS measurement are applicable only in DMTC durations.

Figure 19:
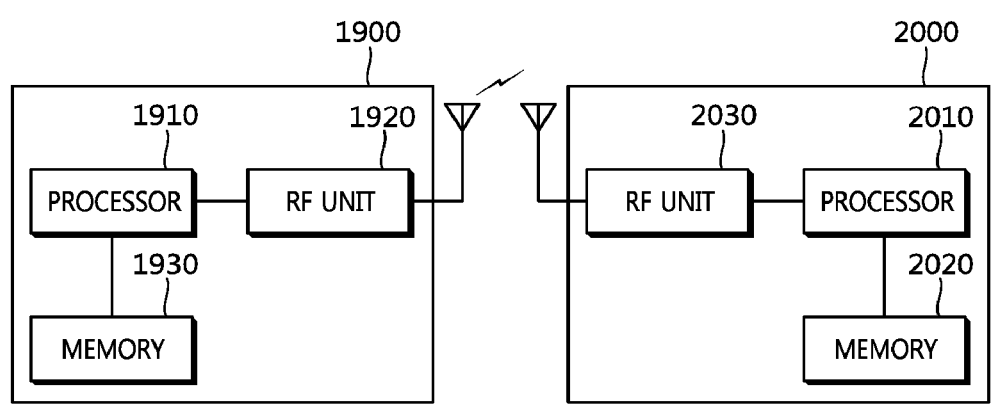
FIG. 19 shows a block diagram which briefly describes a wireless communication system including an UE 1900 and a BS or cell 2000.

FIG. 19 shows a block diagram which briefly describes a wireless communication system including an UE 1900 and a BS or cell 2000. The UE 1900 and the BS 2000 may operate based on the description as explained above. In view of downlink, a transmitter may be a part of the BS 2000 and a receiver may be a part of the UE 1900. In view of uplink, a transmitter may be a part of the UE 1900 and a receiver may be a part of the BS 2000.

Referring to FIG. 19, the UE 1900 may include a processor 1910, a memory 1920 and a radio frequency (RF) unit 1930.

The processor 1910 may be configured to implement proposed procedures and/or methods described in this application. For example, the processor 1910 may operatively coupled to the RF unit 1930, wherein the processor 1910 is configured for transmitting signals via the RF unit 1920 based on a scheduling for UL and/or DL. The processor 1910 may perform single transmission of signal on uplink and single reception of signal on downlink at one subframe via the RF unit 1930.

The memory 1920 is coupled with the processor 1910 and stores a variety of information to operate the processor 1910, which includes data information and/or control information. The RF unit 1930 is also coupled with the processor 1910.

The detailed operations of the UE 1900 are same as described above.

The BS 2000 may include a processor 2010, a memory 2020 and a RF unit 2030. Here, the BS may be PCell or SCell and the BS may be a macro cell or small cell. The processor 2010 may be configured to implement proposed procedures and/or methods described in this application. For example, the processor 2010 may schedule UL and/or DL.

The memory 2020 is coupled with the processor 2010 and stores a variety of information to operate the processor 2010, which includes data information and/or control information. The RF unit 2030 is also coupled with the processor 2010. The RF unit 2030 may transmit and/or receive a radio signal.

The detailed operations of the BS 2000 are same as described above.

The UE 1900 and/or the BS 2000 may have single antenna or multiple antennas. The wireless communication system may be called as multiple input/multiple output (MIMO) system when at least one of the UE 1900 and the BS 2000 have multiple antennas.

As discussed, the UE 1900 in FIG. 19 performs the above-explained technical features. In detail, the UE may receive measurement configuration for a discovery signal (e.g., DRS). The DRS candidates may include CRS, PSS, and SSS. Further, depending on configuration of CSI-RS, the DRS may further includes CSI-RS. Preferably, the measurement configuration includes at least one set of configuration elements, and each set of the configuration elements is defined per a frequency of a corresponding cell. Further, the each set of the configuration elements indicates a measurement period of the discovery signal, an offset of the measurement period, and a measurement duration.

The UE 1900 in FIG. 19 performs a measurement on the discovery signal based on the measurement period of the discovery signal, the offset of the measurement period, and the measurement duration. Further, the UE's measurement on the discovery signal is only performed on a TDD downlink subframe allocated by SIB when an enhanced Interference Mitigation & Traffic Adaptation (eIMTA) is used for the UE. In the conventional arts, CRS measurement is performed in every subframes without referring to any information on periodicity/interval of the CRS. Also, PSS/SSS measurement is performed without referring to any information on periodicity/interval of PSS/SSS. However, to support communication with small cells, which supports power on/off operations, the present specification further proposes DRS configurations, each being set for a certain frequency. Accordingly, the present embodiments are distinctive over the conventional arts. Further, the conventional arts does not provide clarification or solution when the eIMTA is used for UE(s) which supports DRS measurement. For at least this reason, the present embodiments are distinctive of the conventional arts are distinctive over the conventional arts.

In the above exemplary systems, although the methods have been described on the basis of the flowcharts using a series of the steps or blocks, the present specification is not limited to the sequence of the steps, and some of the steps may be performed at different sequences from the remaining steps or may be performed simultaneously with the remaining steps. Furthermore, the above-described embodiments include various aspects of examples. Accordingly, the present specification should be construed to include all other alternations, modifications, and changes which fall within the scope of the claims.

In the description regarding the present specification, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A method of receiving control information for receiving a signal in a wireless communication system, the method performed by a user equipment (UE) and comprising:
    receiving a measurement configuration for a discovery signal,
    wherein the discovery signal includes a primary synchronization signal (PSS) or a secondary synchronization signal (SSS),
    wherein the measurement configuration includes at least one set of configuration elements, the each set of the configuration elements indicates a measurement period of the discovery signal, an offset of the measurement period, and a measurement duration during which the UE measures the discovery signal in one period of the measurement period, and
    wherein the each set of the configuration elements is defined per a frequency.

2. The method of claim 1, wherein all of the measurement period, the offset, and the measurement duration are given in number of subframes.

3. The method of claim 1, further comprising: performing a measurement on the discovery signal based on the measurement configuration.

4. The method of claim 1, wherein, when an enhanced Interference Mitigation & Traffic Adaptation (eIMTA) is used in the UE, the UE assumes to receive a downlink reference signal on downlink subframe allocated by a system information block (SIB).

5. The method of claim 1, wherein the discovery signal further includes a channel status information-reference signal (CSI-RS) depending on a configuration of the CSI-RS, wherein the configuration of the CSI-RS includes an interval of the CSI-RS and an offset of the CSI-RS, wherein the UE further receives a channel status information-reference signal (CSI-RS) configuration including at least one set of CSI-RS configuration elements used for a zero power CSI-RS, wherein the CSI-RS configuration includes at least one set of CSI-RS configuration elements, each set of CSI-RS configuration elements includes CSI-RS interval information and CSI-RS offset information.

6. The method of claim 5, wherein, when the at least one set of CSI-RS configuration elements includes a plurality set of CSR-RS configuration elements, each set of CSI-RS configuration elements includes CSI-RS interval information and CSI-RS offset information, and each set of CSI-RS configuration elements is separately configured.

7. The method of claim 1, further comprising: receiving a measurement gap configuration indicating a length and a repetition period of a measurement gap.

8. The method of claim 1, wherein the measurement configuration for the discovery signal is received via a radio resource control (RRC) message.

9. The method of claim 8, wherein the RRC message is received at the UE which is in an RRC connected mode.

10. The method of claim 1, wherein the measurement on the discovery signal starts on a first subframe carrying the SSS in one period of the measurement period.

11. The method of claim 1, wherein a set of the configuration elements defined for one frequency contains a single measurement period, a single offset, and a single measurement duration.

12. The method of claim 1, wherein the each set of the configuration elements is applied to a plurality of cells having a same frequency.

13. The method of claim 1, wherein a system frame number (SFN) of a macro cell of the UE is used as a reference for a duration where the UE performs the measurement on the discovery signal.

14. The method of claim 1, wherein UE does not perform measurement on the discovery signal in a subframe configured for Multimedia Broadcast/Multicast Service (MBMS) service.

15. A user equipment (UE) for receiving control information for receiving a signal in a wireless communication system, comprising:
    a radio frequency (RF) unit configured for receiving the signal; and
    a processor coupled to the RF unit and configured to:
    receive a measurement configuration for a discovery signal,
    wherein the discovery signal includes a primary synchronization signal (PSS) or a secondary synchronization signal (SSS),
    wherein the measurement configuration includes at least one set of configuration elements, the each set of the configuration elements indicates a measurement period of the discovery signal, an offset of the measurement period, and a measurement duration during which the UE measures the discovery signal in one period of the measurement period, and
    wherein the each set of the configuration elements is defined per a frequency.

16. The UE of claim 15, wherein all of the measurement period, the offset, and the measurement duration are given in number of subframes.

17. The UE of claim 15, wherein the processor is further configured to perform a measurement on the discovery signal based on the measurement configuration.

18. The UE of claim 15, wherein, when an enhanced Interference Mitigation & Traffic Adaptation (eIMTA) is used in the UE, the UE assumes to receive a downlink reference signal on downlink subframe allocated by a system information block (SIB).

* * * * *